United States Patent
Boling et al.

(10) Patent No.: US 12,124,566 B2
(45) Date of Patent: Oct. 22, 2024

(54) SYSTEMS AND METHODS FOR METADATA ENCODING

(71) Applicant: Dover Microsystems, Inc., Wayland, MA (US)

(72) Inventors: Eli Boling, Manchester, MA (US); Steven Milburn, Cranston, RI (US); Gregory T. Sullivan, Auburndale, MA (US); Andrew Sutherland, Portland, OR (US)

(73) Assignee: Dover Microsystems, Inc., Wayland, MA (US)

( * ) Notice: Subject to any disclaimer, the term of this patent is extended or adjusted under 35 U.S.C. 154(b) by 355 days.

(21) Appl. No.: 17/292,694

(22) PCT Filed: Nov. 11, 2019

(86) PCT No.: PCT/US2019/060698
§ 371 (c)(1),
(2) Date: May 10, 2021

(87) PCT Pub. No.: WO2020/102064
PCT Pub. Date: May 22, 2020

(65) Prior Publication Data
US 2022/0012329 A1  Jan. 13, 2022

Related U.S. Application Data

(60) Provisional application No. 62/759,936, filed on Nov. 12, 2018.

(51) Int. Cl.
*G06F 21/00* (2013.01)
*G06F 21/54* (2013.01)
*G06F 21/57* (2013.01)

(52) U.S. Cl.
CPC ............ *G06F 21/54* (2013.01); *G06F 21/577* (2013.01)

(58) Field of Classification Search
CPC .............................. G06F 21/577; G06F 21/54
(Continued)

(56) References Cited

U.S. PATENT DOCUMENTS 5,201,056 A  4/1993 Daniel et al.
5,377,336 A  12/1994 Eickemeyer et al.
(Continued)

FOREIGN PATENT DOCUMENTS

CN  101558388 A  10/2009
CN  102160033 A  8/2011
(Continued)

OTHER PUBLICATIONS

U.S. Appl. No. 16/966,616, filed Jul. 31, 2020, Boling et al.
(Continued)

*Primary Examiner* — Josnel Jeudy
(74) *Attorney, Agent, or Firm* — Wolf, Greenfield & Sacks, P.C.

(57) ABSTRACT

Systems and methods for metadata processing. In some embodiments, a target address may be received from a host processor. The target address may be used to access mapping information and decoding information, the mapping information and the decoding information being associated with the target address. The mapping information may be used to map the target address to a metadata address. The metadata address may be used to retrieve metadata, and the decoding information may be used to decode the retrieved metadata.

27 Claims, 8 Drawing Sheets

(58) Field of Classification Search
USPC .......................................................... 726/26
See application file for complete search history.

(56) References Cited

U.S. PATENT DOCUMENTS

| | | | |
|---|---|---|---|
| 5,488,730 A | 1/1996 | Brown, III et al. |
| 5,521,910 A | 5/1996 | Matthews |
| 5,559,952 A | 9/1996 | Fujimoto |
| 5,655,100 A | 8/1997 | Ebrahim et al. |
| 5,664,197 A | 9/1997 | Kardach et al. |
| 5,664,223 A | 9/1997 | Bender et al. |
| 5,684,977 A | 11/1997 | Van Loo et al. |
| 5,764,946 A | 6/1998 | Tran et al. |
| 5,778,423 A | 7/1998 | Sites et al. |
| 5,848,433 A | 12/1998 | Tran et al. |
| 5,890,008 A | 3/1999 | Panwar et al. |
| 5,941,981 A | 8/1999 | Tran |
| 6,014,734 A | 1/2000 | Tran et al. |
| 6,035,374 A | 3/2000 | Panwar et al. |
| 6,058,466 A | 5/2000 | Panwar et al. |
| 6,240,502 B1 | 5/2001 | Panwar et al. |
| 6,269,436 B1 | 7/2001 | Tran et al. |
| 6,298,432 B1 | 10/2001 | Goto |
| 6,321,297 B1 | 11/2001 | Shamanna et al. |
| 6,324,599 B1 | 11/2001 | Zhou et al. |
| 6,351,784 B1 | 2/2002 | Neal et al. |
| 6,438,673 B1 | 8/2002 | Jourdan et al. |
| 6,449,714 B1 | 9/2002 | Sinharoy |
| 6,549,903 B1 | 4/2003 | Babaian et al. |
| 6,549,959 B1 | 4/2003 | Yates et al. |
| 6,622,182 B1 | 9/2003 | Miller et al. |
| 6,625,146 B1 | 9/2003 | Merchant et al. |
| 6,636,523 B1 | 10/2003 | Lau et al. |
| 6,748,589 B1 | 6/2004 | Johnson et al. |
| 6,922,740 B2 | 7/2005 | Kondratiev et al. |
| 6,976,147 B1 | 12/2005 | Isaac et al. |
| 7,047,394 B1 | 5/2006 | Van Dyke et al. |
| 7,058,918 B2 | 6/2006 | Abramovici et al. |
| 7,095,783 B1 | 8/2006 | Sotheran et al. |
| 7,137,086 B2 | 11/2006 | Abramovici |
| 7,146,548 B1 | 12/2006 | Abramovici |
| 7,213,247 B1 | 5/2007 | Wilner et al. |
| 7,263,572 B2 | 8/2007 | Hiji |
| 7,296,201 B2 | 11/2007 | Abramovici |
| 7,301,541 B2 | 11/2007 | Hansen et al. |
| 7,305,635 B1 | 12/2007 | Abramovici et al. |
| 7,313,820 B2 | 12/2007 | Kilroy |
| 7,340,469 B1 | 3/2008 | Alghathbar et al. |
| 7,348,796 B2 | 3/2008 | Crouch et al. |
| 7,426,705 B1 | 9/2008 | Kolaric |
| 7,430,650 B1 | 9/2008 | Ross |
| 7,434,002 B1 | 10/2008 | Zedlewski et al. |
| 7,467,414 B2 | 12/2008 | Schlesinger |
| 7,487,264 B2 | 2/2009 | Pandya |
| 7,493,247 B2 | 2/2009 | Memmi |
| 7,493,434 B1 | 2/2009 | Abramovici |
| 7,574,536 B2 | 8/2009 | Johnsen et al. |
| 7,580,914 B2 | 8/2009 | Wang et al. |
| 7,581,064 B1 | 8/2009 | Zedlewski et al. |
| 7,631,107 B2 | 12/2009 | Pandya |
| 7,688,838 B1 | 3/2010 | Aloni et al. |
| 7,698,402 B2 | 4/2010 | Santos et al. |
| 7,813,342 B2 | 10/2010 | Gadelrab |
| 7,886,148 B2 | 2/2011 | Kiriansky et al. |
| 8,074,052 B2 | 12/2011 | Iadonato et al. |
| 8,121,828 B2 | 2/2012 | Yates, Jr. et al. |
| 8,127,121 B2 | 2/2012 | Yates, Jr. et al. |
| 8,131,663 B1 | 3/2012 | Taylor |
| 8,131,762 B2 | 3/2012 | Smetters et al. |
| 8,166,404 B2 | 4/2012 | Grinstein |
| 8,181,219 B2 | 5/2012 | Golan et al. |
| 8,271,447 B1 | 9/2012 | Natanzon et al. |
| 8,326,774 B2 | 12/2012 | Candelore |
| 8,335,754 B2 | 12/2012 | Dawson et al. |
| 8,346,760 B2 | 1/2013 | Wang et al. |
| 8,364,910 B2 | 1/2013 | Wilkerson et al. |
| 8,380,933 B2 | 2/2013 | Uchiyama |
| 8,423,720 B2 | 4/2013 | Döring |
| 8,516,193 B1 | 8/2013 | Clinton et al. |
| 8,543,606 B2 | 9/2013 | Pulfer et al. |
| 8,572,410 B1 | 10/2013 | Tkacik et al. |
| 8,677,457 B2 | 3/2014 | Fullerton |
| 8,701,200 B2 | 4/2014 | Naldurg et al. |
| 8,738,860 B1 | 5/2014 | Griffin et al. |
| 8,756,185 B2 | 6/2014 | Dawson et al. |
| 8,788,792 B2 | 7/2014 | Yates, Jr. et al. |
| 8,826,391 B2 | 9/2014 | Tkacik et al. |
| 8,843,734 B2 | 9/2014 | Lim |
| 8,904,477 B2 | 9/2014 | Barton et al. |
| 8,874,850 B1 | 10/2014 | Goodson et al. |
| 8,875,170 B1 | 10/2014 | Daniel |
| 8,887,230 B2 | 11/2014 | Barton et al. |
| 8,938,783 B2 | 1/2015 | Becker et al. |
| 9,026,733 B1 | 5/2015 | Clinton et al. |
| 9,047,178 B2 | 6/2015 | Talagala et al. |
| 9,087,200 B2 | 7/2015 | McKeen et al. |
| 9,165,078 B2 | 10/2015 | Bester et al. |
| 9,208,082 B1 | 12/2015 | Cheriton et al. |
| 9,219,752 B2 | 12/2015 | Balinksy et al. |
| 9,251,052 B2 | 2/2016 | Talagala et al. |
| 9,311,093 B2 | 4/2016 | Gschwind et al. |
| 9,317,708 B2 | 4/2016 | Lee et al. |
| 9,323,684 B2 | 4/2016 | Koker et al. |
| 9,467,474 B2 | 10/2016 | Barton et al. |
| 9,507,589 B2 | 11/2016 | Rao et al. |
| 9,507,598 B1 | 11/2016 | Bonnano et al. |
| 9,513,884 B2 | 12/2016 | Bates et al. |
| 9,525,606 B1 | 12/2016 | Staggs et al. |
| 9,571,509 B1 | 2/2017 | Satish et al. |
| 9,576,147 B1 | 2/2017 | McClintock et al. |
| 9,665,603 B2 | 5/2017 | Bester et al. |
| 9,680,736 B2 | 6/2017 | Kamboh |
| 9,680,738 B2 | 6/2017 | Jackson et al. |
| 9,703,956 B1 | 7/2017 | Watson et al. |
| 9,736,185 B1 | 8/2017 | Belamaric et al. |
| 9,785,440 B2 | 10/2017 | DeHon |
| 9,792,472 B1 | 10/2017 | Robshaw et al. |
| 9,906,557 B2 | 2/2018 | Hsiung et al. |
| 9,953,095 B1 | 4/2018 | Scott et al. |
| 10,073,977 B2 | 9/2018 | Pappachan et al. |
| 10,078,763 B2 | 9/2018 | Chiricescu et al. |
| 10,114,958 B2 | 10/2018 | Sell |
| 10,133,866 B1 | 11/2018 | Kumar et al. |
| 10,152,330 B2 | 12/2018 | Chiricescu et al. |
| 10,235,176 B2 | 3/2019 | DeHon et al. |
| 10,261,794 B2 | 4/2019 | DeHon |
| 10,424,043 B1 | 9/2019 | Koston et al. |
| 10,503,904 B1 | 12/2019 | Singh et al. |
| 10,521,230 B2 | 12/2019 | DeHon |
| 10,545,760 B2 | 1/2020 | DeHon |
| 10,642,616 B2 | 5/2020 | DeHon et al. |
| 10,642,753 B1 | 5/2020 | Steinberg |
| 10,719,630 B2 | 7/2020 | Chiricescu et al. |
| 10,725,778 B2 | 7/2020 | DeHon et al. |
| 10,754,650 B2 | 8/2020 | DeHon et al. |
| 10,936,713 B2 | 3/2021 | DeHon et al. |
| 11,150,910 B2 | 10/2021 | Milburn et al. |
| 11,182,162 B2 | 11/2021 | DeHon et al. |
| 11,340,902 B2 | 5/2022 | DeHon |
| 11,417,109 B1 | 8/2022 | Theimer et al. |
| 11,507,373 B2 | 11/2022 | Dehon et al. |
| 11,556,664 B2 | 1/2023 | Levy et al. |
| 11,635,960 B2 | 4/2023 | DeHon |
| 11,853,554 B2 * | 12/2023 | Utevsky .............. G06F 12/0246 |
| 2002/0083298 A1 | 6/2002 | Cook et al. |
| 2002/0087795 A1 | 7/2002 | Hum et al. |
| 2002/0124156 A1 | 9/2002 | Yoaz et al. |
| 2003/0014466 A1 | 1/2003 | Berger et al. |
| 2003/0023783 A1 | 1/2003 | Arimilli et al. |
| 2003/0058889 A1 | 3/2003 | Lansing et al. |
| 2003/0120892 A1 | 6/2003 | Hum et al. |
| 2003/0145235 A1 | 7/2003 | Choo |
| 2003/0149895 A1 | 8/2003 | Choo et al. |
| 2003/0172109 A1 | 9/2003 | Dalton et al. |

(56) References Cited

U.S. PATENT DOCUMENTS

| | | |
|---|---|---|
| 2003/0196108 A1 | 10/2003 | Kung |
| 2004/0015845 A1 | 1/2004 | Hickman |
| 2004/0117599 A1 | 6/2004 | Mittal et al. |
| 2004/0133777 A1 | 7/2004 | Kiriansky et al. |
| 2004/0236876 A1 | 11/2004 | Kondratiev et al. |
| 2004/0255267 A1 | 12/2004 | Meijer |
| 2005/0055565 A1 | 3/2005 | Fournet et al. |
| 2005/0108518 A1 | 5/2005 | Pandya |
| 2005/0149521 A1 | 7/2005 | Wang et al. |
| 2005/0149719 A1 | 7/2005 | Kilroy |
| 2005/0154838 A1 | 7/2005 | DeWitt et al. |
| 2005/0182667 A1 | 8/2005 | Metzger et al. |
| 2006/0004548 A1 | 1/2006 | Santos et al. |
| 2006/0059567 A1 | 3/2006 | Bird et al. |
| 2006/0080489 A1 | 4/2006 | Hiji |
| 2006/0080553 A1 | 4/2006 | Hall |
| 2006/0090084 A1 | 4/2006 | Buer |
| 2006/0112261 A1 | 5/2006 | Yourst et al. |
| 2006/0143689 A1 | 6/2006 | Yu et al. |
| 2006/0242332 A1 | 10/2006 | Johnsen et al. |
| 2006/0277392 A1 | 12/2006 | Bittner |
| 2007/0006294 A1 | 1/2007 | Hunter |
| 2007/0050586 A1 | 3/2007 | Shin et al. |
| 2007/0226365 A1 | 9/2007 | Hildreth et al. |
| 2007/0239861 A1 | 10/2007 | Reeves et al. |
| 2007/0261033 A1 | 11/2007 | Chen et al. |
| 2007/0279264 A1 | 12/2007 | Nakagawa |
| 2008/0010233 A1 | 1/2008 | Sack et al. |
| 2008/0016547 A1 | 1/2008 | Anderson et al. |
| 2008/0028196 A1 | 1/2008 | Kailas |
| 2008/0052488 A1 | 2/2008 | Fritz et al. |
| 2008/0066160 A1 | 3/2008 | Becker et al. |
| 2008/0083298 A1 | 4/2008 | Lin |
| 2008/0126841 A1 | 5/2008 | Benhanokh et al. |
| 2008/0140737 A1 | 6/2008 | Garst et al. |
| 2008/0168529 A1 | 7/2008 | Anderson et al. |
| 2008/0201333 A1 | 8/2008 | Rowley |
| 2008/0216073 A1 | 9/2008 | Yates et al. |
| 2008/0216102 A1 | 9/2008 | Quinn |
| 2008/0222397 A1 | 9/2008 | Wilkerson et al. |
| 2008/0240111 A1 | 10/2008 | Gadelrab |
| 2008/0244232 A1 | 10/2008 | Sherman et al. |
| 2008/0248599 A1 | 10/2008 | Jaiswal et al. |
| 2008/0250216 A1 | 10/2008 | Kershaw et al. |
| 2008/0282040 A1 | 11/2008 | Doring |
| 2008/0282093 A1 | 11/2008 | Hatakeyama |
| 2008/0288941 A1 | 11/2008 | Adams et al. |
| 2008/0301256 A1 | 12/2008 | McWilliams et al. |
| 2008/0301471 A1 | 12/2008 | Demarest et al. |
| 2008/0320235 A1 | 12/2008 | Beckmann et al. |
| 2009/0006519 A1 | 1/2009 | Nandan et al. |
| 2009/0031142 A1* | 1/2009 | Halevi ............ G06F 12/1408 713/190 |
| 2009/0063951 A1 | 3/2009 | Rjaibi et al. |
| 2009/0097815 A1 | 4/2009 | Lahr et al. |
| 2009/0113110 A1 | 4/2009 | Chen et al. |
| 2009/0113132 A1 | 4/2009 | Cain, III et al. |
| 2009/0113135 A1 | 4/2009 | Cain et al. |
| 2009/0144388 A1 | 6/2009 | Gross et al. |
| 2009/0164705 A1 | 6/2009 | Gorobets |
| 2009/0164766 A1 | 6/2009 | Suggs et al. |
| 2009/0165078 A1 | 6/2009 | Samudrala et al. |
| 2009/0178102 A1 | 7/2009 | Alghathbar et al. |
| 2009/0204785 A1 | 8/2009 | Yates, Jr. et al. |
| 2009/0241097 A1 | 9/2009 | Wang et al. |
| 2009/0254543 A1 | 10/2009 | Ber et al. |
| 2009/0254572 A1 | 10/2009 | Redlich et al. |
| 2010/0011209 A1 | 1/2010 | Kiriansky et al. |
| 2010/0011446 A1 | 1/2010 | Klucher et al. |
| 2010/0022869 A1 | 1/2010 | Kimura |
| 2010/0049974 A1 | 2/2010 | Winjum et al. |
| 2010/0138613 A1 | 6/2010 | Parker |
| 2010/0154026 A1 | 6/2010 | Chatterjee et al. |
| 2010/0169382 A1* | 7/2010 | Sheaffer ............ G06F 12/1027 707/E17.014 |
| 2010/0191922 A1 | 7/2010 | Dickey et al. |
| 2010/0228693 A1 | 9/2010 | Dawson et al. |
| 2010/0235580 A1 | 9/2010 | Bouvier |
| 2010/0250729 A1 | 9/2010 | Morris |
| 2010/0332456 A1 | 12/2010 | Prahlad et al. |
| 2010/0332716 A1 | 12/2010 | Sheaffer et al. |
| 2011/0016295 A1 | 1/2011 | Catherwood et al. |
| 2011/0078389 A1 | 3/2011 | Patel et al. |
| 2011/0099336 A1 | 4/2011 | Yasufuku et al. |
| 2011/0126265 A1 | 5/2011 | Fullerton |
| 2011/0161623 A1 | 6/2011 | Eichenberger et al. |
| 2011/0219424 A1 | 9/2011 | Panasyuk et al. |
| 2011/0238805 A1 | 9/2011 | Signori |
| 2012/0036507 A1 | 2/2012 | Jonnala et al. |
| 2012/0079458 A1 | 3/2012 | Williams et al. |
| 2012/0117610 A1 | 5/2012 | Pandya |
| 2012/0144167 A1 | 6/2012 | Yates, Jr. et al. |
| 2012/0151184 A1 | 6/2012 | Wilkerson et al. |
| 2012/0180031 A1 | 7/2012 | Eichenberger et al. |
| 2012/0203970 A1 | 8/2012 | Biran et al. |
| 2012/0210066 A1 | 8/2012 | Joshi et al. |
| 2012/0210068 A1 | 8/2012 | Joshi et al. |
| 2012/0233212 A1 | 9/2012 | Newton et al. |
| 2012/0236756 A1 | 9/2012 | Bennett et al. |
| 2012/0255018 A1 | 10/2012 | Sallam |
| 2012/0297057 A1 | 11/2012 | Ghosh et al. |
| 2013/0006993 A1 | 1/2013 | Kobayashi |
| 2013/0010779 A1 | 1/2013 | Fischer et al. |
| 2013/0016075 A1 | 1/2013 | Kim et al. |
| 2013/0047142 A1 | 2/2013 | Bates et al. |
| 2013/0067593 A1 | 3/2013 | Candelore |
| 2013/0081134 A1 | 3/2013 | Glew et al. |
| 2013/0097369 A1 | 4/2013 | Talagala et al. |
| 2013/0097421 A1 | 4/2013 | Lim |
| 2013/0097667 A1 | 4/2013 | Pulfer et al. |
| 2013/0138892 A1 | 5/2013 | Loh et al. |
| 2013/0159726 A1 | 6/2013 | McKeen et al. |
| 2013/0160075 A1 | 6/2013 | Schlesinger et al. |
| 2013/0160775 A1 | 6/2013 | Curnow |
| 2013/0185475 A1 | 7/2013 | Talagala et al. |
| 2013/0185488 A1 | 7/2013 | Talagala et al. |
| 2013/0212321 A1 | 8/2013 | Talagala et al. |
| 2013/0227218 A1 | 8/2013 | Chang et al. |
| 2013/0254838 A1 | 9/2013 | Ahuja et al. |
| 2013/0275656 A1 | 10/2013 | Talagala et al. |
| 2013/0283017 A1 | 10/2013 | Wilkerson et al. |
| 2013/0290607 A1 | 10/2013 | Chang et al. |
| 2013/0312099 A1 | 11/2013 | Edwards et al. |
| 2013/0326117 A1 | 12/2013 | Aune |
| 2014/0006804 A1 | 1/2014 | Tkacik et al. |
| 2014/0019385 A1 | 1/2014 | Dawson et al. |
| 2014/0047181 A1 | 2/2014 | Peterson et al. |
| 2014/0047183 A1 | 2/2014 | Chawla et al. |
| 2014/0101396 A1 | 4/2014 | Bonanno et al. |
| 2014/0140342 A1 | 5/2014 | Narad |
| 2014/0173211 A1 | 6/2014 | Loh et al. |
| 2014/0189325 A1* | 7/2014 | Mckeen ............ G06F 9/30047 712/225 |
| 2014/0223445 A1 | 8/2014 | Beckmann et al. |
| 2014/0280248 A1 | 9/2014 | Bester et al. |
| 2014/0281192 A1 | 9/2014 | Gilda et al. |
| 2014/0282832 A1 | 9/2014 | Chanoch et al. |
| 2014/0283040 A1 | 9/2014 | Wilkerson et al. |
| 2014/0283107 A1 | 9/2014 | Walton et al. |
| 2015/0012689 A1 | 1/2015 | Atkisson et al. |
| 2015/0046658 A1 | 2/2015 | Wilson |
| 2015/0058997 A1 | 2/2015 | Lee et al. |
| 2015/0089186 A1 | 3/2015 | Kim et al. |
| 2015/0092778 A1 | 4/2015 | Jackson et al. |
| 2015/0120699 A1 | 4/2015 | Faerber et al. |
| 2015/0149673 A1 | 5/2015 | Balkan et al. |
| 2015/0205535 A1 | 7/2015 | Joshi et al. |
| 2015/0220453 A1 | 8/2015 | Heisswolf et al. |
| 2015/0249668 A1 | 9/2015 | Reddy et al. |
| 2015/0278311 A1 | 10/2015 | Isherwood et al. |
| 2015/0339062 A1 | 11/2015 | Toyoda et al. |
| 2015/0339329 A1 | 11/2015 | Bester et al. |
| 2015/0378780 A1 | 12/2015 | Busaba et al. |
| 2015/0381660 A1 | 12/2015 | Hsiung et al. |

(56) References Cited

U.S. PATENT DOCUMENTS

| | | |
|---|---|---|
| 2016/0048551 A1 | 2/2016 | Baldwin et al. |
| 2016/0062803 A1 | 3/2016 | Beckmann et al. |
| 2016/0077816 A1 | 3/2016 | Eilam et al. |
| 2016/0092702 A1 | 3/2016 | Durham et al. |
| 2016/0132536 A1 | 5/2016 | Lee |
| 2016/0140363 A1 | 5/2016 | Chiricescu et al. |
| 2016/0154833 A1 | 6/2016 | Isherwood, Jr. et al. |
| 2016/0170769 A1 | 6/2016 | LeMay |
| 2016/0182408 A1 | 6/2016 | Jani et al. |
| 2016/0188891 A1 | 6/2016 | Schlesinger et al. |
| 2016/0196432 A1 | 7/2016 | Main et al. |
| 2016/0239223 A9 | 8/2016 | Joshi et al. |
| 2016/0274810 A1 | 9/2016 | Godard et al. |
| 2016/0335187 A1 | 11/2016 | Greenspan et al. |
| 2016/0350019 A1 | 12/2016 | Koufaty et al. |
| 2016/0350230 A1 | 12/2016 | Murphy |
| 2016/0366102 A1 | 12/2016 | Smith |
| 2016/0371496 A1 | 12/2016 | Sell |
| 2017/0024568 A1 | 1/2017 | Pappachan et al. |
| 2017/0031708 A1 | 2/2017 | Chen et al. |
| 2017/0048249 A1 | 2/2017 | Berrangé |
| 2017/0061160 A1 | 3/2017 | Simonov et al. |
| 2017/0083338 A1 | 3/2017 | Burger et al. |
| 2017/0091107 A1 | 3/2017 | Peterson et al. |
| 2017/0126687 A1 | 5/2017 | Martinelli |
| 2017/0126738 A1 | 5/2017 | Wilkerson et al. |
| 2017/0177367 A1 | 6/2017 | DeHon |
| 2017/0177368 A1 | 6/2017 | DeHon et al. |
| 2017/0192986 A1 | 7/2017 | Isherwood et al. |
| 2017/0220806 A1 | 8/2017 | Munoz et al. |
| 2017/0235840 A1 | 8/2017 | Bester et al. |
| 2017/0286119 A1 | 10/2017 | Al Sheikh et al. |
| 2017/0286151 A1 | 10/2017 | Landers et al. |
| 2017/0293563 A1 | 10/2017 | DeHon et al. |
| 2017/0308480 A1 | 10/2017 | Wilson |
| 2017/0329961 A1 | 11/2017 | Shanbhogue et al. |
| 2018/0011708 A1 | 1/2018 | DeHon |
| 2018/0046579 A1 | 2/2018 | Greenspan et al. |
| 2018/0082055 A1 | 3/2018 | Fleming et al. |
| 2018/0121650 A1 | 5/2018 | Brown |
| 2018/0143890 A1 | 5/2018 | Ogawa et al. |
| 2018/0189062 A1 | 7/2018 | Baghsorkhi et al. |
| 2018/0210842 A1* | 7/2018 | Nuzman ............ G06F 12/1027 |
| 2018/0232310 A1* | 8/2018 | Chang ................ G06F 12/0864 |
| 2018/0276085 A1 | 9/2018 | Mitkar et al. |
| 2018/0302443 A1 | 10/2018 | Weiss et al. |
| 2018/0336031 A1 | 11/2018 | DeHon et al. |
| 2018/0336032 A1 | 11/2018 | DeHon et al. |
| 2018/0336033 A1 | 11/2018 | DeHon |
| 2018/0341490 A1 | 11/2018 | DeHon |
| 2019/0034665 A1 | 1/2019 | Chiricescu et al. |
| 2019/0141059 A1 | 5/2019 | Shimizu et al. |
| 2019/0155606 A1 | 5/2019 | Rotem et al. |
| 2019/0171457 A1 | 6/2019 | DeHon et al. |
| 2019/0205244 A1 | 7/2019 | Smith |
| 2019/0213322 A1 | 7/2019 | DeHon et al. |
| 2019/0236272 A1 | 8/2019 | Piatt |
| 2019/0243655 A1 | 8/2019 | Milburn et al. |
| 2019/0243768 A1 | 8/2019 | Doshi et al. |
| 2019/0278713 A1* | 9/2019 | Gandhi ............... G06F 12/1027 |
| 2019/0354675 A1 | 11/2019 | Gan et al. |
| 2019/0384604 A1 | 12/2019 | DeHon et al. |
| 2019/0392146 A1 | 12/2019 | Gezalov et al. |
| 2019/0392147 A1 | 12/2019 | Gezalov et al. |
| 2020/0089500 A1 | 3/2020 | DeHon |
| 2020/0112710 A1* | 4/2020 | Oh ........................ H04N 19/174 |
| 2020/0125502 A1 | 4/2020 | Durham et al. |
| 2020/0201576 A1 | 6/2020 | Yudanov et al. |
| 2020/0242047 A1* | 7/2020 | Evans ................ G06F 16/2282 |
| 2020/0387374 A1 | 12/2020 | DeHon |
| 2020/0387384 A1 | 12/2020 | Huang |
| 2021/0004231 A1 | 1/2021 | DeHon |
| 2021/0026934 A1 | 1/2021 | Boling et al. |
| 2021/0042100 A1 | 2/2021 | Boling et al. |
| 2021/0055954 A1 | 2/2021 | Milburn et al. |
| 2021/0073375 A1 | 3/2021 | Milburn et al. |
| 2021/0075797 A1 | 3/2021 | Gan et al. |
| 2021/0255890 A1 | 8/2021 | Milburn et al. |
| 2021/0406028 A1 | 12/2021 | Boling et al. |
| 2021/0406137 A1 | 12/2021 | Sutherland et al. |
| 2022/0043654 A1 | 2/2022 | DeHon et al. |
| 2022/0050904 A1 | 2/2022 | Sullivan et al. |
| 2022/0092173 A1 | 3/2022 | Sutherland et al. |
| 2022/0129343 A1 | 4/2022 | Milburn et al. |
| 2022/0198014 A1 | 6/2022 | Boling et al. |
| 2022/0300583 A1 | 9/2022 | Boling et al. |
| 2022/0309134 A1 | 9/2022 | Boling et al. |
| 2022/0374415 A1 | 11/2022 | Boling et al. |
| 2022/0398312 A1 | 12/2022 | Sutherland et al. |
| 2023/0054942 A1 | 2/2023 | Milburn et al. |

FOREIGN PATENT DOCUMENTS

| | | |
|---|---|---|
| CN | 103282889 A | 9/2013 |
| CN | 104657500 A | 5/2015 |
| CN | 104794067 A | 7/2015 |
| GB | 2519608 A | 4/2015 |
| JP | 2013-242633 A | 12/2013 |
| TW | 201333722 A | 8/2013 |
| TW | 201729068 A | 8/2017 |
| TW | 201737675 A | 10/2017 |
| WO | WO 92/03779 A1 | 3/1992 |
| WO | WO 2010/028316 A1 | 3/2010 |
| WO | WO 2015/047295 A1 | 4/2015 |
| WO | WO 2015/183481 A1 | 12/2015 |
| WO | WO 2017/106101 A1 | 6/2017 |
| WO | WO 2017/106103 A2 | 6/2017 |
| WO | WO 2017/221373 A1 | 12/2017 |
| WO | WO 2019/152772 A1 | 8/2019 |
| WO | WO 2019/152792 A1 | 8/2019 |
| WO | WO 2019/152795 A1 | 8/2019 |
| WO | WO 2019/152805 A1 | 8/2019 |
| WO | WO 2019/152822 A1 | 8/2019 |
| WO | WO 2019/213061 A1 | 11/2019 |
| WO | WO 2020/097177 A1 | 5/2020 |
| WO | WO 2020/097179 A1 | 5/2020 |
| WO | WO 2020/102064 A1 | 5/2020 |
| WO | WO 2020/132012 A1 | 6/2020 |
| WO | WO 2020/150351 A1 | 7/2020 |
| WO | WO 2021/076871 A1 | 4/2021 |
| WO | WO 2021/092138 A1 | 5/2021 |

OTHER PUBLICATIONS

U.S. Appl. No. 16/966,863, filed Jul. 31, 2020, Milburn et al.
U.S. Appl. No. 17/051,741, filed Oct. 29, 2020, Sutherland et al.
U.S. Appl. No. 16/966,865, filed Jul. 31, 2020, Milburn et al.
U.S. Appl. No. 17/507,398, filed Oct. 21, 2021, Milburn et al.
U.S. Appl. No. 15/168,689, filed May 31, 2016, DeHon et al.
U.S. Appl. No. 15/426,098, filed Feb. 7, 2017, DeHon.
U.S. Appl. No. 15/624,878, filed Jun. 16, 2017, DeHon et al.
U.S. Appl. No. 15/695,541, filed Sep. 5, 2017, DeHon.
U.S. Appl. No. 16/002,642, filed Jun. 7, 2018, DeHon et al.
U.S. Appl. No. 16/002,757, filed Jun. 7, 2018, DeHon et al.
U.S. Appl. No. 16/002,957, filed Jun. 7, 2018, DeHon.
U.S. Appl. No. 16/002,987, filed Jun. 7, 2018, DeHon.
U.S. Appl. No. 16/062,791, filed Jun. 15, 2018, DeHon et al.
U.S. Appl. No. 16/256,640, filed Jan. 24, 2019, DeHon et al.
U.S. Appl. No. 16/684,172, filed Nov. 14, 2019, DeHon.
U.S. Appl. No. 16/905,680, filed Jun. 18, 2020, DeHon.
U.S. Appl. No. 16/929,692, filed Jul. 15, 2020, DeHon.
U.S. Appl. No. 16/062,796, filed Jun. 15, 2018, DeHon et al.
U.S. Appl. No. 16/264,773, filed Feb. 1, 2019, Milburn et al.
U.S. Appl. No. 17/474,830, filed Sep. 14, 2021, Milburn et al.
U.S. Appl. No. 17/312,675, filed Jun. 10, 2021, Sullivan et al.
U.S. Appl. No. 17/423,701, filed Jul. 16, 2021, Sutherland et al.
U.S. Appl. No. 16/966,866, filed Jul. 31, 2020, Boling et al.
U.S. Appl. No. 17/308,868, filed May 5, 2021, Milburn et al.
U.S. Appl. No. 17/452,271, filed Oct. 26, 2021, DeHon.
U.S. Appl. No. 17/560,975, filed Dec. 23, 2021, Boling et al.
U.S. Appl. No. 17/711,092, filed Apr. 1, 2022, Boling et al.

(56) References Cited

OTHER PUBLICATIONS

U.S. Appl. No. 17/720,035, filed Apr. 13, 2022, Boling et al.
U.S. Appl. No. 17/769,868, filed Apr. 18, 2022, Boling et al.
U.S. Appl. No. 17/774,799, filed May 5, 2022, Sutherland et al.
International Search Report and Written Opinion for International Application No. PCT/US2019/016242 mailed Mar. 29, 2019.
International Search Report and Written Opinion for International Application No. PCT/US2016/066194 mailed Apr. 7, 2017.
International Search Report and Written Opinion for International Application No. PCT/US2016/066188 mailed Jul. 13, 2017.
Invitation to Pay Additional Fees for International Application No. PCT/US2019/016295 mailed May 3, 2019.
International Search Report and Written Opinion for International Application No. PCT/US2019/016295 mailed Jun. 26, 2019.
International Preliminary Report on Patentability for International Application No. PCT/US2019/016295 mailed Aug. 13, 2020.
International Search Report and Written Opinion for International Application No. PCT/US2019/016276 mailed Apr. 26, 2019.
International Search Report and Written Opinion for International Application No. PCT/US2019/029880 mailed Aug. 8, 2019.
International Search Report and Written Opinion for International Application No. PCT/US2019/016317 mailed Apr. 16, 2019.
International Search Report and Written Opinion for International Application No. PCT/US2020/059057 mailed Feb. 8, 2021.
International Search Report and Written Opinion for International Application No. PCT/US2019/060030 mailed May 20, 2021.
International Search Report and Written Opinion for International Application No. PCT/US2019/060698 mailed May 20, 2021.
International Search Report and Written Opinion for International Application No. PCT/US2019/067084 mailed Jul. 1, 2021.
International Search Report and Written Opinion for International Application No. PCT/US2019/013678 mailed Jul. 29, 2021.
Invitation to Pay Additional Fees for International Application No. PCT/US2019/013678 mailed Apr. 15, 2020.
International Search Report and Written Opinion for International Application No. PCT/US2021/020602 mailed May 11, 2021.
International Search Report and Written Opinion for International Application No. PCT/US2020/055952 mailed Jan. 28, 2021.
International Preliminary Report on Patentability for International Application No. PCT/US2019/060028 mailed May 20, 2021.
International Search Report and Written Opinion for International Application No. PCT/US2019/060028 mailed Mar. 23, 2020.
International Search Report and Written Opinion for International Application No. PCT/US2019/016272 mailed Apr. 8, 2019.
International Preliminary Report on Patentability for International Application No. PCT/US2019/016272 mailed Aug. 13, 2020.
International Preliminary Report on Patentability for International Application No. PCT/US2019/016276 mailed Aug. 13, 2020.
International Preliminary Report on Patentability for International Application No. PCT/US2019/029880 mailed Nov. 12, 2020.
International Preliminary Report on Patentability for International Application No. PCT/US2019/016317 mailed Aug. 13, 2020.
International Preliminary Report on Patentability for International Application No. PCT/US2020/055952 mailed Aug. 13, 2020.
[No Author Listed], Arm Limited: AMBA® AXI™ and ACE™ Protocol Specification. Oct. 28, 2011:1-306. [https://capocaccia.ethz.ch/capo/raw-attachment/wiki/2014/microblaze14/AX14_specification.pdf.].
Alves-Foss et al., Evaluating the Use of Security Tags in Security Policy Enforcement Mechanisms. 2015 48th Hawaii International Conference on System Sciences Jan. 5, 2015:5201-10.
Berlekamp, Algebraic coding theory (revised edition). World Scientific; Mar. 26, 2015. 34 pages.
Calder et al., Process Algebra for Event-Driven Runtime Verification: A Case Study of Wireless Network Management. IFM LNCS 2012;21-23.
Dalton et al., Raksha: a flexible information flow architecture for software security. ACM Proceedings of the 34$^{th}$ Annual International Symposium in Computer Architecture. Jun. 9, 2007;35(2):482-93.

Dalton et al., Real-World Buffer Overflow Protection for Userspace and Kernelspace. USENIX Security Symposium Jul. 28, 2008;395-410.
De Amorim et al., A verified information-flow architecture. Proceedings of the 41st ACM SIGPLAN-SIGACT Symposium on Principles of Programming Languages Jan. 8, 2014:165-78.
De Amorim et al., Micro-policies: Formally verified, tag-based security monitors. 2015 IEEE Symposium on Security and Privacy May 17, 2015:813-30.
Dehon et al., Dover a Metadata-Extended RISC-V. Jan. 6, 2016:34. [https://web.archive.org/web/20160331131339 if /http://riscv.org/wp-content/uploads/2016/01/Wed1430-dover riscv jan2016 v3.pdf].
Dehon et al., Dover: A metadata-extended RISC-V. RISC-V Workshop Oracle Conference Center, Redwood Shores, CA. Jan. 6, 2016. 33 pages.
Dhawan et al., Architectural support for software-defined metadata processing. Proceedings of the Twentieth International Conference on Architectural Support for Programming Languages and Operating Systems (ASPLOS). Mar. 14, 2015:487-502.
Dhawan et al., Area-efficient near-associative memories on FPGAs. ACM Transactions on Reconfigurable Technology and Systems (TRETS). Jan. 23, 2015;7(4):1-22.
Dhawan et al., PUMP: a programmable unit for metadata processing. Proceedings of the Third Workshop on Hardware and Architectural Support for Security and Privacy (HASP). Jun. 15, 2014:1-8.
Engelke et al., Efficient LLVM-Based Dynamic Binary Translation. ACM VEE. Apr. 16, 2021;165-71.
Evans et al., Melding security metadata between software and hardware. Proceedings of the Posters and Demo Track Dec. 3, 2012:1-2.
Geater, Tee requirements for ISA. Thales eSecurity. 2018. 21 pages.
Hriţcu, Micro-policies: Formally verified, tag-based security monitors. Proceedings of the 10th ACM Workshop on Programming Languages and Analysis for Security Jul. 4, 2015.
Hunt et al., The Seven Properties of Highly Secure Devices. 2021. 10 pages.
Juglaret et al., Towards a fully abstract compiler using Micro-Policies: Secure compilation for mutually distrustful components. arXiv preprint arXiv:1510.00697. Oct. 2, 2015. 31 pages.
Kane, Runtime Monitoring for Safety-Critical Embedded Systems. Carnegie Mellon University. Feb. 2015;207 pages.
Kannan et al., Decoupling dynamic information flow tracking with a dedicated coprocessor. 2009 IEEE/IFIP International Conference on Dependable Systems & Networks. Jun. 29, 2009:105-14.
Mambretti et al., Trellis: Privilege separation for multi-user applications made easy. International Symposium on Research in Attacks, Intrusions, and Defenses. Springer, Cham. Sep. 19, 2016:437-56.
Nagarakatte et al., SoftBound: Highly Compatible and Complete Spatial Memory Safety for C. University of Pennsylvania Department of Computer and Information Science Technical Report. Jan. 2009. 12 pages.
Okhravi et al., One Giant Leap for Computer Security. IEEE Computer and Reliability Societies. Jul./Aug. 2020;18(4):8-19.
Ozsoy et al., SIFT: A low-overhead dynamic information flow tracking architecture for smt processors. Proceedings of the 8th ACM International Conference on Computing Frontiers. May 3, 2011:1-11.
Roessler et al., Protecting the stack with metadata policies and tagged hardware. 2018 IEEE Symposium on Security and Privacy (SP) May 20, 2018:478-95.
Song et al., Security tagging for a zero-kernel operating system. 2013 46th Hawaii International Conference on System Sciences Jan. 7, 2013:5049-58.
Song et al., The 4th lowRISC Release: Tagged Memory and Minion Core. University of Cambridge. May 2017. 20 pages. https://riscv.org/wp-content/uploads/2017/05/Wed0930riscv201705_ppt.pdf [Last accessed Mar. 31, 2022].
Suh et al., Secure Program Execution via Dynamic Information Flow Tracking. MIT CSAIL. Jul. 2003. 14 pages.
Sullivan et al., The dover inherently secure processor. 2017 IEEE International Symposium on Technologies for Homeland Security (HST) Apr. 25, 2017:1-5.

(56) References Cited

OTHER PUBLICATIONS

Tiwari et al., A small cache of large ranges: Hardware methods for efficiently searching, storing, and updating big dataflow tags. 2008 41st IEEE/ACM International Symposium on Microarchitecture Nov. 8, 2008:94-105.
Tiwari et al., Complete information flow tracking from the gates up. InProceedings of the 14th international conference on Architectural support for programming languages and operating systems Mar. 7, 2009;109-20.
Waterman et al., The RISC-V Instruction Set Manual, vol. I: Unprivileged ISA, Document Version Dec. 13, 2019. RISC-V Foundation. Dec. 2019. 238 pages.
Watson et al., Cheri: A hybrid capability-system architecture for scalable software compartmentalization. 2015 IEEE Symposium on Security and Privacy Sep. 2015;20-37.
Witchel et al., Mondrian Memory Protection. ASPLOS-X. 2002;13 pages.
Woodruff, Cheri: A RISC capability machine for practical memory safety. University of Cambridge, Computer Laboratory; 2014. 112 pages.
Zeldovich et al., Hardware Enforcement of Application Security Policies Using Tagged Memory. USENIX Symposium on Operating Systems Design and Implementation. Dec. 8, 2008:8;225-40.
U.S. Appl. No. 17/880,539, filed Aug. 3, 2022, Milburn et al.
U.S. Appl. No. 17/908,879, filed Sep. 1, 2022, Milburn et al.
International Preliminary Report on Patentability for International Application No. PCT/US2020/059057, mailed May 19, 2022.
International Search Report and Written Opinion for International Application No. PCT/US2019/060030 mailed Mar. 19, 2020.
International Search Report and Written Opinion for International Application No. PCT/US2019/060698 mailed Feb. 3, 2020.
International Search Report and Written Opinion for International Application No. PCT/US2019/067084 mailed Mar. 19, 2020.
International Search Report and Written Opinion for International Application No. PCT/US2019/013678 mailed Jun. 23, 2020.
International Preliminary Report on Patentability for International Application No. PCT/US2021/020602, mailed Sep. 15, 2022.
International Preliminary Report on Patentability for International Application No. PCT/US2020/055952 mailed Apr. 28, 2022.
Mutlu, 18-447 Computer Architecture Lecture 11: Precise Exceptions, State Maintenance, State Recovery. Carnegie Mellon University Lecture. Feb. 11, 2015, 49 pages.
International Search Report and Written Opinion for International Application No. PCT/US2022/042492 mailed Jan. 11, 2023.

\* cited by examiner

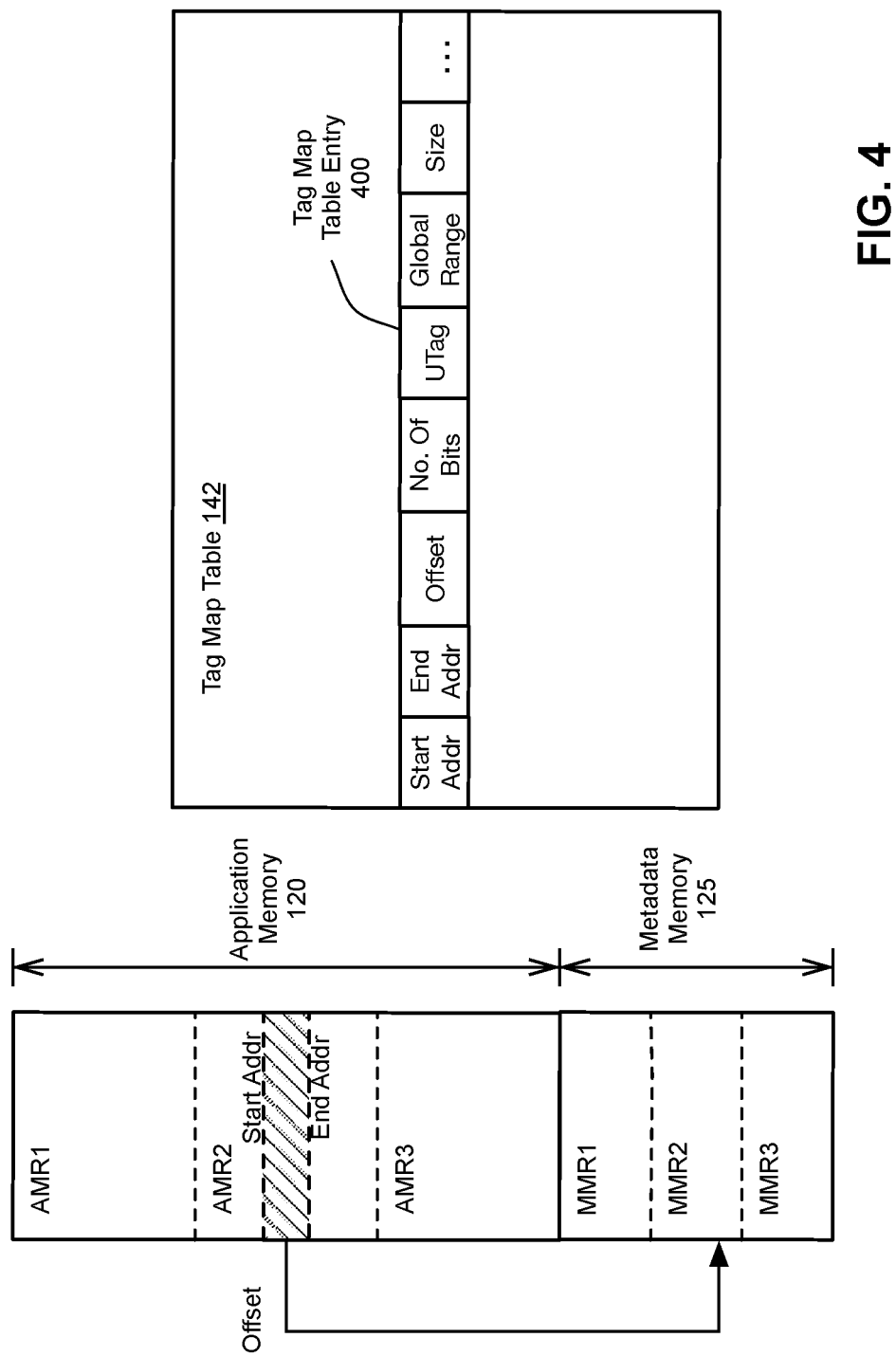

SYSTEMS AND METHODS FOR METADATA ENCODING

RELATED APPLICATION

This application is a national stage filing under 35 U.S.C. § 371 of International Patent Application Serial No. PCT/US2019/060698, filed Nov. 11, 2019, which claims the benefit under 35 U.S.C. § 119(e) of U.S. Provisional Patent Application Ser. No. 62/759,936, filed on Nov. 12, 2018, titled "SYSTEMS AND METHODS FOR METADATA PROCESSING," The contents of these applications are incorporated herein by reference in their entirety.

BACKGROUND

Computer security has become an increasingly urgent concern at all levels of society, from individuals to businesses to government institutions. For example, in 2015, security researchers identified a zero-day vulnerability that would have allowed an attacker to hack into a Jeep Cherokee's on-board computer system via the Internet and take control of the vehicle's dashboard functions, steering, brakes, and transmission. In 2017, the WannaCry ransomware attack was estimated to have affected more than 200,000 computers worldwide, causing at least hundreds of millions of dollars in economic losses. Notably, the attack crippled operations at several National Health Service hospitals in the UK. In the same year, a data breach at Equifax, a US consumer credit reporting agency, exposed person data such as full names, social security numbers, birth dates, addresses, driver's license numbers, credit card numbers, etc. That attack is reported to have affected over 140 million consumers.

Security professionals are constantly playing catch-up with attackers. As soon as a vulnerability is reported, security professionals race to patch the vulnerability. Individuals and organizations that fail to patch vulnerabilities in a timely manner (e.g., due to poor governance and/or lack of resources) become easy targets for attackers.

Some security software monitors activities on a computer and/or within a network, and looks for patterns that may be indicative of an attack. Such an approach does not prevent malicious code from being executed in the first place. Often, the damage has been done by the time any suspicious pattern emerges.

SUMMARY

In accordance with some embodiments, a method for metadata processing is provided, the method comprising acts of: receiving, from a host processor, a target address; using the target address to access mapping information and decoding information, the mapping information and the decoding information being associated with the target address; using the mapping information to map the target address to a metadata address; using the metadata address to retrieve metadata; and using the decoding information to decode the retrieved metadata.

In accordance with some embodiments, a method for metadata processing is provided, the method comprising acts of: receiving, from a host processor, a target address; determining whether to retrieve, from a metadata memory, a metadata value associated with the target address; in response to determining to retrieve a metadata value from the metadata memory: mapping the target address to a metadata address; and using the metadata address to retrieve a metadata value from the metadata memory; and in response to determining not to retrieve a metadata value from the metadata memory, determining a default metadata value.

In accordance with some embodiments, a method for metadata processing is provided, the method comprising acts of: associating one or more metadata labels with an application memory region; generating an encoding for the one or more metadata labels associated with the application memory region; and generating decoding information corresponding to the encoding for the one or more metadata labels associated with the application memory region.

In accordance with some embodiments, a method for metadata processing is provided, the method comprising acts of: receiving, from a host processor, a target address; using the target address to access mapping information associated with the target address, wherein: the mapping information is associated with an application memory address range; the target address belongs to the application memory address range; and the mapping information comprises information indicative of a tagging granularity for the application memory address range; using the mapping information to map the target address to a metadata address; and using the metadata address to retrieve metadata.

In accordance with some embodiments, a method for metadata processing is provided, the method comprising acts of: receiving, from a host processor, a target address; using the target address to access mapping information associated with the target address; using the mapping information to map the target address to at least first metadata address and second metadata address; using the first and second metadata addresses to retrieve, respectively, first and second metadata; and combining the first and second metadata.

In accordance with some embodiments, a system is provided, comprising circuitry and/or one or more processors programmed by executable instructions, wherein the circuitry and/or the one or more programmed processors are configured to perform any of the methods described herein.

In accordance with some embodiments, at least one computer-readable medium is provided, having stored thereon at least one netlist for any of the circuitries described herein.

In accordance with some embodiments, at least one computer-readable medium is provided, having stored thereon at least one hardware description that, when synthesized, produces any of the netlists described herein.

In accordance with some embodiments, at least one computer-readable medium is provided, having stored thereon any of the executable instructions described herein.

BRIEF DESCRIPTION OF DRAWINGS

FIG. 4 shows another illustrative tag map table entry 400, in accordance with some embodiments.

DETAILED DESCRIPTION

Many vulnerabilities exploited by attackers trace back to a computer architectural design where data and executable instructions are intermingled in a same memory. This intermingling allows an attacker to inject malicious code into a remote computer by disguising the malicious code as data. For instance, a program may allocate a buffer in a computer's memory to store data received via a network. If the program receives more data than the buffer can hold, but does not check the size of the received data prior to writing the data into the buffer, part of the received data would be written beyond the buffer's boundary, into adjacent memory. An attacker may exploit this behavior to inject malicious code into the adjacent memory. If the adjacent memory is allocated for executable code, the malicious code may eventually be executed by the computer.

Techniques have been proposed to make computer hardware more security aware. For instance, memory locations may be associated with metadata for use in enforcing security policies, and instructions may be checked for compliance with the security policies. For example, given an instruction to be executed, metadata associated with the instruction and/or metadata associated with one or more operands of the instruction may be checked to determine if the instruction should be allowed. Additionally, or alternatively, appropriate metadata may be associated with an output of the instruction.

Figure 1:
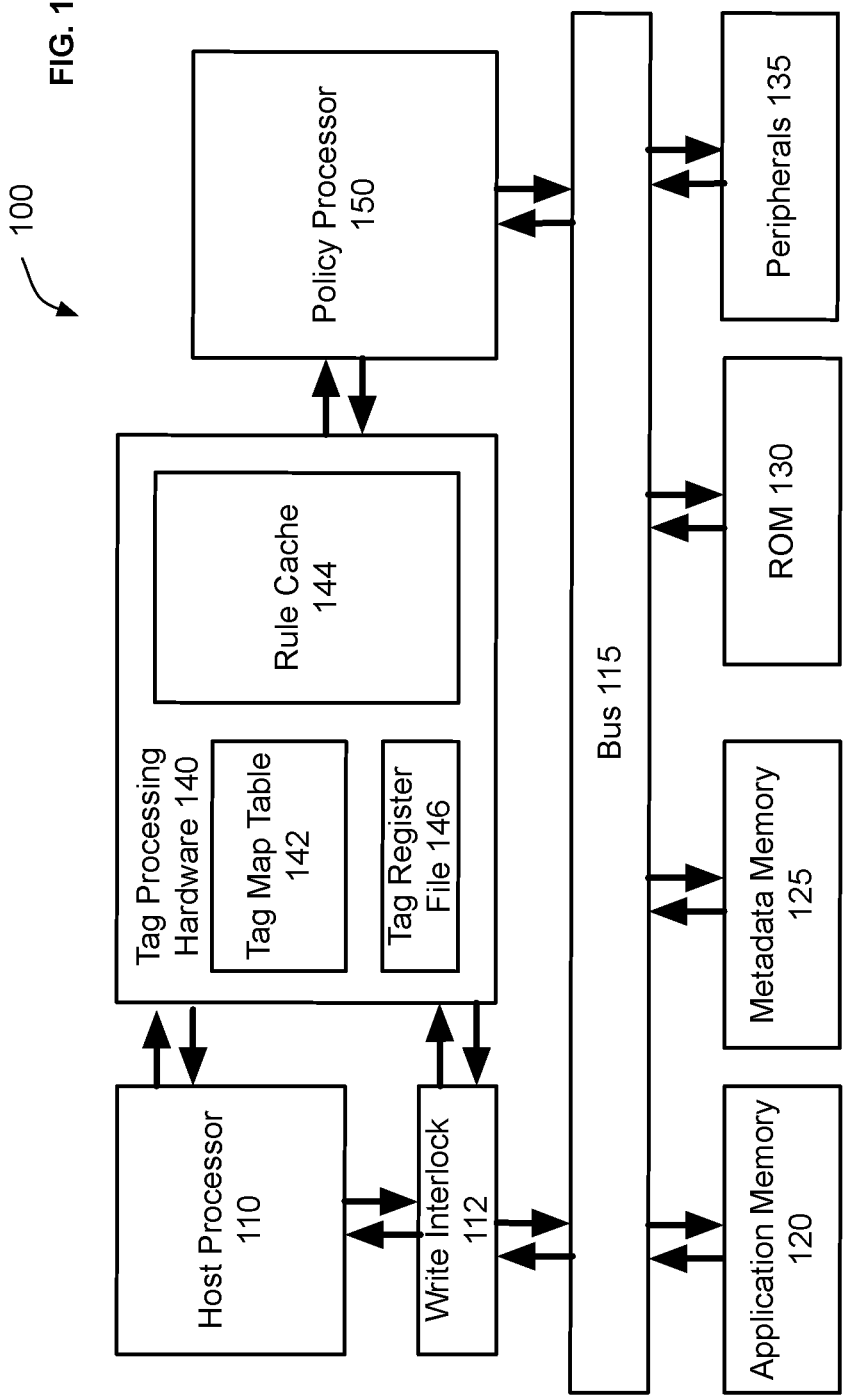
FIG. 1 shows an illustrative hardware system 100 for enforcing policies, in accordance with some embodiments.

FIG. 1 shows an illustrative hardware system 100 for enforcing policies, in accordance with some embodiments. In this example, the system 100 includes a host processor 110, which may have any suitable instruction set architecture (ISA) such as a reduced instruction set computing (RISC) architecture or a complex instruction set computing (CISC) architecture. The host processor 110 may perform memory accesses via a write interlock 112. The write interlock 112 may be connected to a system bus 115 configured to transfer data between various components such as the write interlock 112, an application memory 120, a metadata memory 125, a read-only memory (ROM) 130, one or more peripherals 135, etc.

In some embodiments, data that is manipulated (e.g., modified, consumed, and/or produced) by the host processor 110 may be stored in the application memory 120. Such data is referred to herein as "application data," as distinguished from metadata used for enforcing policies. The latter may be stored in the metadata memory 125. It should be appreciated that application data may include data manipulated by an operating system (OS), instructions of the OS, data manipulated by one or more user applications, and/or instructions of the one or more user applications.

In some embodiments, the application memory 120 and the metadata memory 125 may be physically separate, and the host processor 110 may have no access to the metadata memory 125. In this manner, even if an attacker succeeds in injecting malicious code into the application memory 120 and causing the host processor 110 to execute the malicious code, the metadata memory 125 may not be affected. However, it should be appreciated that aspects of the present disclosure are not limited to storing application data and metadata on physically separate memories. Additionally, or alternatively, metadata may be stored in a same memory as application data, and a memory management component may be used that implements an appropriate protection scheme to prevent instructions executing on the host processor 110 from modifying the metadata. Additionally, or alternatively, metadata may be intermingled with application data in a same memory, and one or more policies may be used to protect the metadata.

In some embodiments, tag processing hardware 140 may be provided to ensure that instructions being executed by the host processor 110 comply with one or more policies. The tag processing hardware 140 may include any suitable circuit component or combination of circuit components. For instance, the tag processing hardware 140 may include a tag map table 142 that maps addresses in the application memory 120 to addresses in the metadata memory 125. For example, the tag map table 142 may map an address X in the application memory 120 to an address Y in the metadata memory 125. A value stored at the address Y is sometimes referred to herein as a "metadata tag" or simply a "tag."

In some embodiments, a value stored at the address Y may in turn be an address Z. Such indirection may be repeated any suitable number of times, and may eventually lead to a data structure in the metadata memory 125 for storing metadata. Such metadata, as well as any intermediate address (e.g., the address Z), are also referred to herein as "metadata tags" or simply "tags."

It should be appreciated that aspects of the present disclosure are not limited to a tag map table that stores addresses in a metadata memory. In some embodiments, a tag map table entry itself may store metadata, so that the tag processing hardware 140 may be able to access the metadata without performing a memory operation. In some embodiments, a tag map table entry may store a selected bit pattern, where a first portion of the bit pattern may encode metadata, and a second portion of the bit pattern may encode an address in a metadata memory where further metadata may be stored. This may provide a desired balance between speed and expressivity. For instance, the tag processing hardware 140 may be able to check certain policies quickly, using only the metadata stored in the tag map table entry itself. For other policies with more complex rules, the tag processing hardware 140 may access the further metadata stored in the metadata memory 125.

Referring again to FIG. 1, by mapping application memory addresses to metadata memory addresses, the tag map table 142 may create an association between application data and metadata that describes the application data. In one example, metadata stored at the metadata memory address Y and thus associated with application data stored at the application memory address X may indicate that the application data may be readable, writable, and/or executable. In another example, metadata stored at the metadata memory address Y and thus associated with application data stored at the application memory address X may indicate a type of the application data (e.g., integer, pointer, 16-bit word, 32-bit word, etc.). Depending on a policy to be enforced, any suitable metadata relevant for the policy may be associated with a piece of application data.

In some embodiments, a metadata memory address Z may be stored at the metadata memory address Y. Metadata to be associated with the application data stored at the application memory address X may be stored at the metadata memory address Z, instead of (or in addition to) the metadata memory address Y. For instance, a binary representation of a metadata symbol "RED" may be stored at the metadata memory address Z. By storing the metadata memory address Z in the metadata memory address Y, the application data stored at the application memory address X may be tagged "RED."

In this manner, the binary representation of the metadata symbol "RED" may be stored only once in the metadata memory 120. For instance, if application data stored at another application memory address X' is also to be tagged "RED," the tag map table 142 may map the application memory address X' to a metadata memory address Y' where the metadata memory address Z is also stored.

Moreover, in this manner, tag update may be simplified. For instance, if the application data stored at the application memory address X is to be tagged "BLUE" at a subsequent time, a metadata memory address Z' may be written at the metadata memory address Y, to replace the metadata memory address Z, and a binary representation of the metadata symbol "BLUE" may be stored at the metadata memory address Z'.

Thus, the inventors have recognized and appreciated that a chain of metadata memory addresses of any suitable length N may be used for tagging, including N=0 (e.g., where a binary representation of a metadata symbol is stored at the metadata memory address Y itself).

The association between application data and metadata (also referred to herein as "tagging") may be done at any suitable level of granularity, and/or variable granularity. For instance, tagging may be done on a word-by-word basis. Additionally, or alternatively, a region in memory may be mapped to a single tag, so that all words in that region are associated with the same metadata. This may advantageously reduce a size of the tag map table 142 and/or the metadata memory 125. For example, a single tag may be maintained for an entire address range, as opposed to maintaining multiple tags corresponding, respectively, to different addresses in the address range.

In some embodiments, the tag processing hardware 140 may be configured to apply one or more rules to metadata associated with an instruction and/or metadata associated with one or more operands of the instruction to determine if the instruction should be allowed. For instance, the host processor 110 may fetch and execute an instruction, and may queue a result of executing the instruction into the write interlock 112. Before the result is written back into the application memory 120, the host processor 110 may send, to the tag processing hardware 140, an instruction type (e.g., opcode), an address where the instruction is stored, one or more memory addresses referenced by the instruction, and/or one or more register identifiers. Such a register identifier may identify a register used by the host processor 110 in executing the instruction, such as a register for storing an operand or a result of the instruction.

In some embodiments, destructive read instructions may be queued in addition to, or instead of, write instructions. For instance, subsequent instructions attempting to access a target address of a destructive read instruction may be queued in a memory region that is not cached. If and when it is determined that the destructive read instruction should be allowed, the queued instructions may be loaded for execution.

In some embodiments, a destructive read instruction may be allowed to proceed, and data read from a target address may be captured in a buffer. If and when it is determined that the destructive read instruction should be allowed, the data captured in the buffer may be discarded. If and when it is determined that the destructive read instruction should not be allowed, the data captured in the buffer may be restored to the target address. Additionally, or alternatively, a subsequent read may be serviced by the buffered data.

It should be appreciated that aspects of the present disclosure are not limited to performing metadata processing on instructions that have been executed by a host processor, such as instructions that have been retired by the host processor's execution pipeline. In some embodiments, metadata processing may be performed on instructions before, during, and/or after the host processor's execution pipeline.

In some embodiments, given an address received from the host processor 110 (e.g., an address where an instruction is stored, or an address referenced by an instruction), the tag processing hardware 140 may use the tag map table 142 to identify a corresponding tag. Additionally, or alternatively, for a register identifier received from the host processor 110, the tag processing hardware 140 may access a tag from a tag register file 146 within the tag processing hardware 140.

In some embodiments, if an application memory address does not have a corresponding entry in the tag map table 142, the tag processing hardware 140 may send a query to a policy processor 150. The query may include the application memory address in question, and the policy processor 150 may return a tag for that application memory address. Additionally, or alternatively, the policy processor 150 may create a new tag map entry for an address range including the application memory address. In this manner, the appropriate tag may be made available, for future reference, in the tag map table 142 in association with the application memory address in question.

In some embodiments, the tag processing hardware 140 may send a query to the policy processor 150 to check if an instruction executed by the host processor 110 should be allowed. The query may include one or more inputs, such as an instruction type (e.g., opcode) of the instruction, a tag for a program counter, a tag for an application memory address from which the instruction is fetched (e.g., a word in memory to which the program counter points), a tag for a register in which an operand of the instruction is stored, and/or a tag for an application memory address referenced by the instruction. In one example, the instruction may be a load instruction, and an operand of the instruction may be an application memory address from which application data is to be loaded. The query may include, among other things, a tag for a register in which the application memory address is stored, as well as a tag for the application memory address itself. In another example, the instruction may be an arithmetic instruction, and there may be two operands. The query may include, among other things, a first tag for a first register in which a first operand is stored, and a second tag for a second register in which a second operand is stored.

It should also be appreciated that aspects of the present disclosure are not limited to performing metadata processing on a single instruction at a time. In some embodiments, multiple instructions in a host processor's ISA may be checked together as a bundle, for example, via a single query to the policy processor 150. Such a query may include more inputs to allow the policy processor 150 to check all of the instructions in the bundle. Similarly, a CISC instruction, which may correspond semantically to multiple operations, may be checked via a single query to the policy processor 150, where the query may include sufficient inputs to allow the policy processor 150 to check all of the constituent operations within the CISC instruction.

In some embodiments, the policy processor 150 may include a configurable processing unit, such as a microprocessor, a field-programmable gate array (FPGA), and/or any other suitable circuitry. The policy processor 150 may have loaded therein one or more policies that describe allowed operations of the host processor 110. In response to a query from the tag processing hardware 140, the policy processor 150 may evaluate one or more of the policies to determine if an instruction in question should be allowed. For instance, the tag processing hardware 140 may send an interrupt signal to the policy processor 150, along with one or more inputs relating to the instruction in question (e.g., as described above). The policy processor 150 may store the inputs of the query in a working memory (e.g., in one or more queues) for immediate or deferred processing. For example, the policy processor 150 may prioritize processing of queries in some suitable manner (e.g., based on a priority flag associated with each query).

In some embodiments, the policy processor 150 may evaluate one or more policies on one or more inputs (e.g., one or more input tags) to determine if an instruction in question should be allowed. If the instruction is not to be allowed, the policy processor 150 may so notify the tag processing hardware 140. If the instruction is to be allowed, the policy processor 150 may compute one or more outputs (e.g., one or more output tags) to be returned to the tag processing hardware 140. As one example, the instruction may be a store instruction, and the policy processor 150 may compute an output tag for an application memory address to which application data is to be stored. As another example, the instruction may be an arithmetic instruction, and the policy processor 150 may compute an output tag for a register for storing a result of executing the arithmetic instruction.

In some embodiments, the policy processor 150 may be programmed to perform one or more tasks in addition to, or instead of, those relating to evaluation of policies. For instance, the policy processor 150 may perform tasks relating to tag initialization, boot loading, application loading, memory management (e.g., garbage collection) for the metadata memory 125, logging, debugging support, and/or interrupt processing. One or more of these tasks may be performed in the background (e.g., between servicing queries from the tag processing hardware 140).

In some embodiments, the tag processing hardware 140 may include a rule cache 144 for mapping one or more inputs to a decision and/or one or more outputs. For instance, a query into the rule cache 144 may be similarly constructed as a query to the policy processor 150 to check if an instruction executed by the host processor 110 should be allowed. If there is a cache hit, the rule cache 144 may output a decision as to whether to the instruction should be allowed, and/or one or more output tags (e.g., as described above in connection with the policy processor 150). Such a mapping in the rule cache 144 may be created using a query response from the policy processor 150. However, that is not required, as in some embodiments, one or more mappings may be installed into the rule cache 144 ahead of time.

In some embodiments, the rule cache 144 may be used to provide a performance enhancement. For instance, before querying the policy processor 150 with one or more input tags, the tag processing hardware 140 may first query the rule cache 144 with the one or more input tags. In case of a cache hit, the tag processing hardware 140 may proceed with a decision and/or one or more output tags from the rule cache 144, without querying the policy processor 150. This may provide a significant speedup. In case of a cache miss, the tag processing hardware 140 may query the policy processor 150, and may install a response from the policy processor 150 into the rule cache 144 for potential future use.

In some embodiments, if the tag processing hardware 140 determines that an instruction in question should be allowed (e.g., based on a hit in the rule cache 144, or a miss in the rule cache 144, followed by a response from the policy processor 150 indicating no policy violation has been found), the tag processing hardware 140 may indicate to the write interlock 112 that a result of executing the instruction may be written back to memory. Additionally, or alternatively, the tag processing hardware 140 may update the metadata memory 125, the tag map table 142, and/or the tag register file 146 with one or more output tags (e.g., as received from the rule cache 144 or the policy processor 150). As one example, for a store instruction, the metadata memory 125 may be updated based on an address translation by the tag map table 142. For instance, an application memory address referenced by the store instruction may be used to look up a metadata memory address from the tag map table 142, and metadata received from the rule cache 144 or the policy processor 150 may be stored to the metadata memory 125 at the metadata memory address. As another example, where metadata to be updated is stored in an entry in the tag map table 142 (as opposed to being stored in the metadata memory 125), that entry in the tag map table 142 may be updated. As another example, for an arithmetic instruction, an entry in the tag register file 146 corresponding to a register used by the host processor 110 for storing a result of executing the arithmetic instruction may be updated with an appropriate tag.

In some embodiments, if the tag processing hardware 140 determines that the instruction in question represents a policy violation (e.g., based on a miss in the rule cache 144, followed by a response from the policy processor 150 indicating a policy violation has been found), the tag processing hardware 140 may indicate to the write interlock 112 that a result of executing the instruction should be discarded, instead of being written back to memory. Additionally, or alternatively, the tag processing hardware 140 may send an interrupt to the host processor 110. In response to receiving the interrupt, the host processor 110 may switch to any suitable violation processing code. For example, the host processor 100 may halt, reset, log the violation and continue, perform an integrity check on application code and/or application data, notify an operator, etc.

In some embodiments, the rule cache 144 may be implemented with a hash function and a designated portion of a memory (e.g., the metadata memory 125). For instance, a hash function may be applied to one or more inputs to the rule cache 144 to generate an address in the metadata memory 125. A rule cache entry corresponding to the one or more inputs may be stored to, and/or retrieved from, that address in the metadata memory 125. Such an entry may include the one or more inputs and/or one or more corresponding outputs, which may be computed from the one or more inputs at run time, load time, link time, or compile time.

In some embodiments, the tag processing hardware 140 may include one or more configuration registers. Such a register may be accessible (e.g., by the policy processor 150) via a configuration interface of the tag processing hardware 140. In some embodiments, the tag register file 146 may be implemented as configuration registers. Additionally, or alternatively, there may be one or more application configuration registers and/or one or more metadata configuration registers.

Although details of implementation are shown in FIG. 1 and discussed above, it should be appreciated that aspects of the present disclosure are not limited to the use of any particular component, or combination of components, or to any particular arrangement of components. For instance, in some embodiments, one or more functionalities of the policy processor 150 may be performed by the host processor 110. As an example, the host processor 110 may have different operating modes, such as a user mode for user applications and a privileged mode for an operating system. Policy-related code (e.g., tagging, evaluating policies, etc.) may run in the same privileged mode as the operating system, or a different privileged mode (e.g., with even more protection against privilege escalation).

Figure 2:
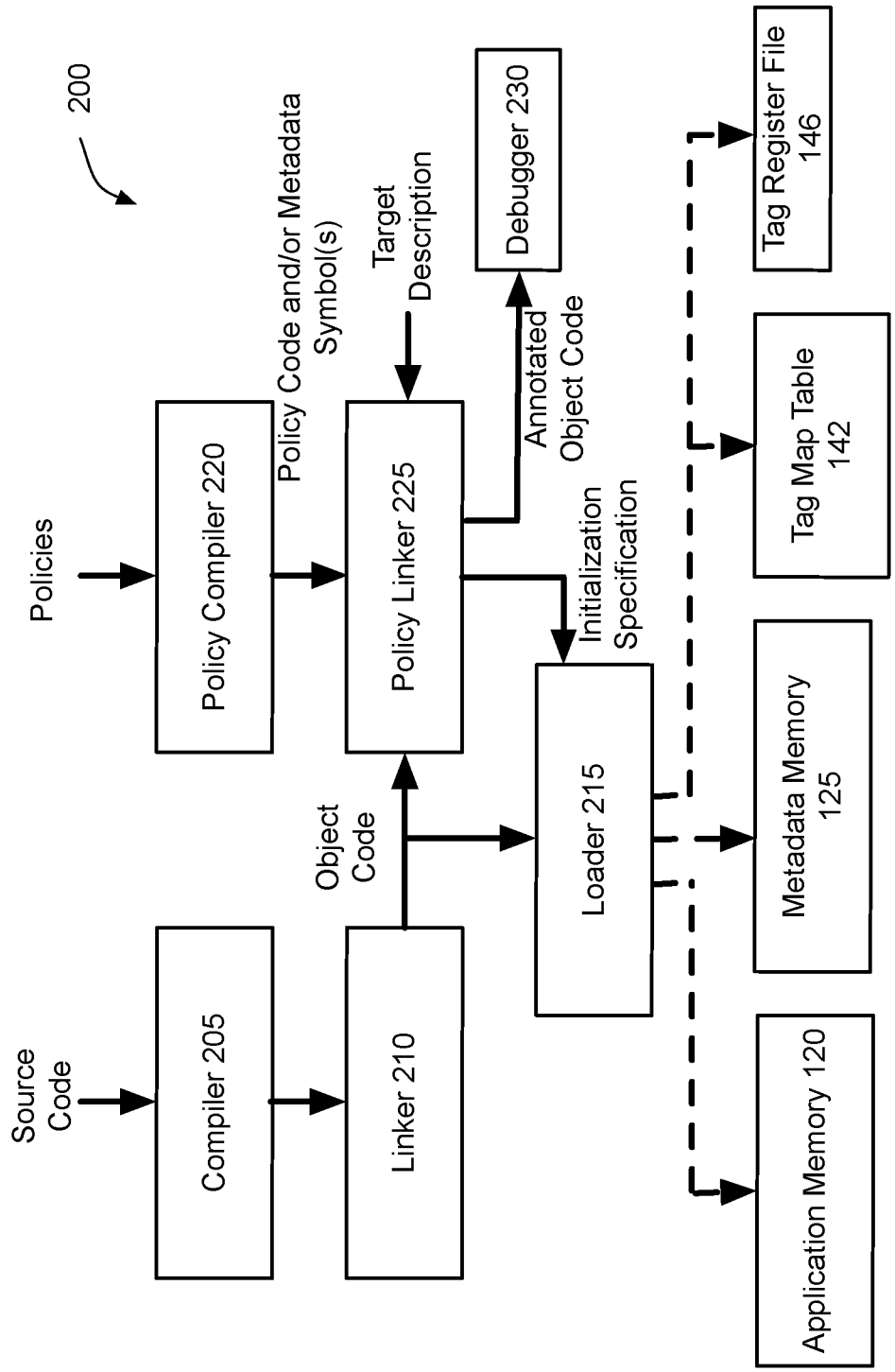
FIG. 2 shows an illustrative software system 200 for enforcing policies, in accordance with some embodiments.

FIG. 2 shows an illustrative software system 200 for enforcing policies, in accordance with some embodiments. For instance, the software system 200 may be programmed to generate executable code and/or load the executable code into the illustrative hardware system 100 shown in FIG. 1.

In the example shown in FIG. 2, the software system 200 includes a software toolchain having a compiler 205, a linker 210, and a loader 215. The compiler 205 may be programmed to process source code into executable code, where the source code may be in a higher-level language and the executable code may be in a lower level language. The linker 210 may be programmed to combine multiple object files generated by the compiler 205 into a single object file to be loaded by the loader 215 into memory (e.g., the illustrative application memory 120 in the example of FIG. 1). Although not shown, the object file output by the linker 210 may be converted into a suitable format and stored in persistent storage, such as flash memory, hard disk, read-only memory (ROM), etc. The loader 215 may retrieve the object file from the persistent storage, and load the object file into random-access memory (RAM).

In some embodiments, the compiler 205 may be programmed to generate information for use in enforcing policies. For instance, as the compiler 205 translates source code into executable code, the compiler 205 may generate information regarding data types, program semantics and/or memory layout. As one example, the compiler 205 may be programmed to mark a boundary between one or more instructions of a function and one or more instructions that implement calling convention operations (e.g., passing one or more parameters from a caller function to a callee function, returning one or more values from the callee function to the caller function, storing a return address to indicate where execution is to resume in the caller function's code when the callee function returns control back to the caller function, etc.). Such boundaries may be used, for instance, during initialization to tag certain instructions as function prologue or function epilogue. At run time, a stack policy may be enforced so that, as function prologue instructions execute, certain locations in a call stack (e.g., where a return address is stored) may be tagged as "frame" locations, and as function epilogue instructions execute, the "frame" tags may be removed. The stack policy may indicate that instructions implementing a body of the function (as opposed to function prologue and function epilogue) only have read access to "frame" locations. This may prevent an attacker from overwriting a return address and thereby gaining control.

As another example, the compiler 205 may be programmed to perform control flow analysis, for instance, to identify one or more control transfer points and respective destinations. Such information may be used in enforcing a control flow policy. As yet another example, the compiler 205 may be programmed to perform type analysis, for example, by applying type labels such as Pointer, Integer, Floating-Point Number, etc. Such information may be used to enforce a policy that prevents misuse (e.g., using a floating-point number as a pointer).

Although not shown in FIG. 2, the software system 200 may, in some embodiments, include a binary analysis component programmed to take, as input, object code produced by the linker 210 (as opposed to source code), and perform one or more analyses similar to those performed by the compiler 205 (e.g., control flow analysis, type analysis, etc.).

In the example of FIG. 2, the software system 200 further includes a policy compiler 220 and a policy linker 225. The policy compiler 220 may be programmed to translate a policy written in a policy language into policy code. For instance, the policy compiler 220 may output policy code in C or some other suitable programming language. Additionally, or alternatively, the policy compiler 220 may output one or more metadata symbols referenced by the policy. At initialization, such a metadata symbol may be associated with one or more memory locations, registers, and/or other machine state of a target system, and may be resolved into a binary representation of metadata to be loaded into a metadata memory or some other hardware storage (e.g., registers) of the target system. As discussed above, such a binary representation of metadata, or a pointer to a location at which the binary representation is stored, is sometimes referred to herein as a "tag."

It should be appreciated that aspects of the present disclosure are not limited to resolving metadata symbols at load time. In some embodiments, one or more metadata symbols may be resolved statically (e.g., at compile time or link time). For example, the policy compiler 220 may process one or more applicable policies, and resolve one or more metadata symbols defined by the one or more policies into a statically defined binary representation. Additionally, or alternatively, the policy linker 225 may resolve one or more metadata symbols into a statically defined binary representation, or a pointer to a data structure storing a statically defined binary representation. The inventors have recognized and appreciated that resolving metadata symbols statically may advantageously reduce load time processing. However, aspects of the present disclosure are not limited to resolving metadata symbols in any particular manner.

In some embodiments, the policy linker 225 may be programmed to process object code (e.g., as output by the linker 210), policy code (e.g., as output by the policy compiler 220), and/or a target description, to output an initialization specification. The initialization specification may be used by the loader 215 to securely initialize a target system having one or more hardware components (e.g., the illustrative hardware system 100 shown in FIG. 1) and/or one or more software components (e.g., an operating system, one or more user applications, etc.).

In some embodiments, the target description may include descriptions of a plurality of named entities. A named entity may represent a component of a target system. As one example, a named entity may represent a hardware component, such as a configuration register, a program counter, a register file, a timer, a status flag, a memory transfer unit, an input/output device, etc. As another example, a named entity may represent a software component, such as a function, a module, a driver, a service routine, etc.

In some embodiments, the policy linker 225 may be programmed to search the target description to identify one or more entities to which a policy pertains. For instance, the policy may map certain entity names to corresponding metadata symbols, and the policy linker 225 may search the target description to identify entities having those entity names. The policy linker 225 may identify descriptions of those entities from the target description, and use the descriptions to annotate, with appropriate metadata symbols, the object code output by the linker 210. For instance, the policy linker 225 may apply a Read label to a .rodata section of an Executable and Linkable Format (ELF) file, a Read label and a Write label to a .data section of the ELF file, and an Execute label to a .text section of the ELF file. Such information may be used to enforce a policy for memory access control and/or executable code protection (e.g., by checking read, write, and/or execute privileges).

It should be appreciated that aspects of the present disclosure are not limited to providing a target description to the policy linker 225. In some embodiments, a target description may be provided to the policy compiler 220, in addition to, or instead of, the policy linker 225. The policy compiler 220 may check the target description for errors. For instance, if an entity referenced in a policy does not exist in the target description, an error may be flagged by the policy compiler 220. Additionally, or alternatively, the policy compiler 220 may search the target description for entities that are relevant for one or more policies to be enforced, and may produce a filtered target description that includes entities descriptions for the relevant entities only. For instance, the policy compiler 220 may match an entity name in an "init" statement of a policy to be enforced to an entity description in the target description, and may remove from the target description (or simply ignore) entity descriptions with no corresponding "init" statement.

In some embodiments, the loader 215 may initialize a target system based on an initialization specification produced by the policy linker 225. For instance, with reference to the example of FIG. 1, the loader 215 may load data and/or instructions into the application memory 120, and may use the initialization specification to identify metadata labels associated with the data and/or instructions being loaded into the application memory 120. The loader 215 may resolve the metadata labels in the initialization specification into respective binary representations. However, it should be appreciated that aspects of the present disclosure are not limited to resolving metadata labels at load time. In some embodiments, a universe of metadata labels may be known during policy linking, and therefore metadata labels may be resolved at that time, for example, by the policy linker 225. This may advantageously reduce load time processing of the initialization specification.

In some embodiments, the policy linker 225 and/or the loader 215 may maintain a mapping of binary representations of metadata back to human readable versions of metadata labels. Such a mapping may be used, for example, by a debugger 230. For instance, in some embodiments, the debugger 230 may be provided to display a human readable version of an initialization specification, which may list one or more entities and, for each entity, a set of one or more metadata labels associated with the entity. Additionally, or alternatively, the debugger 230 may be programmed to display assembly code annotated with metadata labels, such as assembly code generated by disassembling object code annotated with metadata labels. During debugging, the debugger 230 may halt a program during execution, and allow inspection of entities and/or metadata tags associated with the entities, in human readable form. For instance, the debugger 230 may allow inspection of entities involved in a policy violation and/or metadata tags that caused the policy violation. The debugger 230 may do so using the mapping of binary representations of metadata back to metadata labels.

In some embodiments, a conventional debugging tool may be extended to allow review of issues related to policy enforcement, for example, as described above. Additionally, or alternatively, a stand-alone policy debugging tool may be provided.

In some embodiments, the loader 215 may load the binary representations of the metadata labels into the metadata memory 125, and may record the mapping between application memory addresses and metadata memory addresses in the tag map table 142. For instance, the loader 215 may create an entry in the tag map table 142 that maps an application memory address where an instruction is stored in the application memory 120, to a metadata memory address where metadata associated with the instruction is stored in the metadata memory 125. Additionally, or alternatively, the loader 215 may store metadata in the tag map table 142 itself (as opposed to the metadata memory 125), to allow access without performing any memory operation.

In some embodiments, the loader 215 may initialize the tag register file 146 in addition to, or instead of, the tag map table 142. For instance, the tag register file 146 may include a plurality of registers corresponding, respectively, to a plurality of entities. The loader 215 may identify, from the initialization specification, metadata associated with the entities, and store the metadata in the respective registers in the tag register file 146.

With reference again to the example of FIG. 1, the loader 215 may, in some embodiments, load policy code (e.g., as output by the policy compiler 220) into the metadata memory 125 for execution by the policy processor 150. Additionally, or alternatively, a separate memory (not shown in FIG. 1) may be provided for use by the policy processor 150, and the loader 215 may load policy code and/or associated data into the separate memory.

In some embodiments, a metadata label may be based on multiple metadata symbols. For instance, an entity may be subject to multiple policies, and may therefore be associated with different metadata symbols corresponding, respectively, to the different policies. The inventors have recognized and appreciated that it may be desirable that a same set of metadata symbols be resolved by the loader 215 to a same binary representation (which is sometimes referred to herein as a "canonical" representation). For instance, a metadata label {A, B, C} and a metadata label {B, A, C} may be resolved by the loader 215 to a same binary representation. In this manner, metadata labels that are syntactically different but semantically equivalent may have the same binary representation.

The inventors have further recognized and appreciated it may be desirable to ensure that a binary representation of metadata is not duplicated in metadata storage. For instance, as discussed above, the illustrative rule cache 144 in the example of FIG. 1 may map input tags to output tags, and, in some embodiments, the input tags may be metadata memory addresses where binary representations of metadata are stored, as opposed to the binary representations themselves. The inventors have recognized and appreciated that if a same binary representation of metadata is stored at two different metadata memory addresses X and Y, the rule cache 144 may not "recognize" the metadata memory address Y even if the rule cache 144 already stores a mapping for the metadata memory address X. This may result in a large number of unnecessary rule cache misses, which may degrade system performance.

Moreover, the inventors have recognized and appreciated that having a one-to-one correspondence between binary representations of metadata and their storage locations may facilitate metadata comparison. For instance, equality between two pieces of metadata may be determined simply by comparing metadata memory addresses, as opposed to comparing binary representations of metadata. This may result in significant performance improvement, especially where the binary representations are large (e.g., many metadata symbols packed into a single metadata label).

Accordingly, in some embodiments, the loader 215 may, prior to storing a binary representation of metadata (e.g., into the metadata memory 125), check if the binary representation of metadata has already been stored. If the binary representation of metadata has already been stored, instead of storing it again at a different storage location, the loader 215 may refer to the existing storage location. Such a check may be done at startup and/or when a program is loaded subsequent to startup (with or without dynamic linking).

Additionally, or alternatively, a similar check may be performed when a binary representation of metadata is created as a result of evaluating one or more policies (e.g., by the illustrative policy processor 150). If the binary representation of metadata has already been stored, a reference to the existing storage location may be used (e.g., installed in the illustrative rule cache 144).

In some embodiments, the loader 215 may create a hash table mapping hash values to storage locations. Before storing a binary representation of metadata, the loader 215 may use a hash function to reduce the binary representation of metadata into a hash value, and check if the hash table already contains an entry associated with the hash value. If so, the loader 215 may determine that the binary representation of metadata has already been stored, and may retrieve, from the entry, information relating to the binary representation of metadata (e.g., a pointer to the binary representation of metadata, or a pointer to that pointer). If the hash table does not already contain an entry associated with the hash value, the loader 215 may store the binary representation of metadata (e.g., to a register or a location in a metadata memory), create a new entry in the hash table in association with the hash value, and store appropriate information in the new entry (e.g., a register identifier, a pointer to the binary representation of metadata in the metadata memory, a pointer to that pointer, etc.). However, it should be appreciated that aspects of the present disclosure are not limited to the use of a hash table for keeping track of binary representations of metadata that have already been stored. Additionally, or alternatively, other data structures may be used, such as a graph data structure, an ordered list, an unordered list, etc. Any suitable data structure or combination of data structures may be selected based on any suitable criterion or combination of criteria, such as access time, memory usage, etc.

It should be appreciated that the techniques introduced above and discussed in greater detail below may be implemented in any of numerous ways, as the techniques are not limited to any particular manner of implementation. Examples of implementation details are provided herein solely for illustrative purposes. Furthermore, the techniques disclosed herein may be used individually or in any suitable combination, as aspects of the present disclosure are not limited to the use of any particular technique or combination of techniques.

For instance, while examples are discussed herein that include a compiler (e.g., the illustrative compiler 205 and/or the illustrative policy compiler 220 in the example of FIG. 2), it should be appreciated that aspects of the present disclosure are not limited to using a compiler. In some embodiments, a software toolchain may be implemented as an interpreter. For example, a lazy initialization scheme may be implemented, where one or more default symbols (e.g., "UNINITIALIZED") may be used for tagging at startup, and a policy processor (e.g., the illustrative policy processor 150 in the example of FIG. 1) may evaluate one or more policies and resolve the one or more default symbols in a just-in-time manner.

The inventors have recognized and appreciated that it may be desirable to reduce an amount of memory used for storing metadata. This may be achieved by using smaller metadata tags. For instance, by associating each word in an application memory with 16 bits of metadata, as opposed to 32 bits of metadata, a 50% reduction in metadata memory usage may be achieved. However, if each metadata value is only 16 bits long, at most $2^{16}$ (=65,536) distinct metadata values may be available, which may be insufficient if many complex policies are to be enforced simultaneously. For instance, a metadata value in memory may be a binary representation of a metadata label, which may be based on multiple metadata symbols corresponding, respectively, to multiple polices. With an encoding that uses one bit for each distinct metadata symbol, a metadata value of 16 bits long may accommodate only 16 distinct metadata symbols.

Accordingly, in some embodiments, techniques are provided for reducing metadata memory usage while making available a sufficiently large number of distinct metadata values. For instance, different metadata encoding/decoding schemes may be provided, such that a single metadata value of a reduced size (e.g., 16 bits) may be resolved into different metadata values of an unreduced size (e.g., 32 bits) depending on which encoding/decoding scheme is used. In this manner, metadata values of the reduced size may be stored in a metadata memory, and may be converted into metadata values of the unreduced size for use in evaluating policies (e.g., by a policy processor or a rule cache).

In some embodiments, an application memory may include a plurality of regions, and a different metadata encoding/decoding scheme may be provided for each region. The inventors have recognized and appreciated that some metadata symbols may be associated only with addresses in certain application memory regions. As one example, an "EXECUTE" symbol for a Read-Write-eXecute (RWX) policy may be associated only with addresses in an application memory region for storing code.[1] Likewise, a "PROLOGUE" or "EPILOGUE" symbol for a stack policy may be associated only with addresses in an application memory region for storing code. Thus, the "EXECUTE," "PROLOGUE," and "EPILOGUE" symbols may be disregarded when generating an encoding for an application memory region that only stores data (as opposed to code). Such a regionalized encoding may therefore use fewer bits than a global encoding that encodes all symbols.

[1] A "WRITE" symbol for the RWX policy may be associated only with addresses in an application memory region for storing data, and a "READ" symbol for the RWX policy may be associated with addresses in both memory regions.

Moreover, the inventors have recognized and appreciated that a same metadata value may be used to encode different metadata labels, provided there is a way to disambiguate (e.g., based on application memory region). For instance, the "EXECUTE" symbol for the RWX policy may be associated only with addresses in an application memory region for storing code, whereas the "WRITE" symbol for the RWX policy may be associated only with addresses in an application memory region for storing data. Thus, a same bit position in a metadata value (e.g., a 16-bit value) may be used to encode the "EXECUTE" symbol and the "WRITE" symbol.

To disambiguate, the code memory region and the data memory region may, in some embodiments, be associated with different prefixes (e.g., different 16-bit prefixes), respectively. When tagging an address in the code memory region, the metadata value encoding both the "EXECUTE" symbol and the "WRITE" symbol may be resolved by prepending the prefix associated with the code memory region, resulting in a metadata value (e.g., a 32-bit value) corresponding to a metadata label comprising the "EXECUTE" symbol. By contrast, when tagging an address in the data memory region, the metadata value encoding both the "EXECUTE" symbol and the "WRITE" symbol may be resolved by prepending the prefix associated with the data memory region, resulting in a metadata value (e.g., a 32-bit value) corresponding to a metadata label comprising the "WRITE" symbol. However, it should be appreciated that aspects of the present disclosure are not limited to any particular metadata encoding/decoding scheme, or any particular reduced size for metadata tags. In some embodiments, different reduced sizes (e.g., 1 bit, 2 bits, 3 bits, 4 bits, 5 bits, 7 bits, 8 bits, etc.) may be provided, for example, based on a number of distinct metadata symbols to be enumerated.

The inventors have recognized and appreciated that some metadata symbols may be associated with addresses in multiple application memory regions. For instance, a "READ" symbol for the RWX policy may be associated with addresses in a code memory region, as well as addresses in a data memory region. For a metadata label comprising such symbols, it may be desirable to provide a same encoding across the different application memory regions, so that only one rule may be provided in a rule cache (e.g., the illustrative rule cache 144 shown in FIG. 1).

Accordingly, in some embodiments, a selected set of metadata values may be designated as "global" metadata values. For instance, a range of metadata values (e.g., {0000 0000 0000 0000, . . . , 0000 0000 0001 1111}) may be designated as a "global" metadata range. In some embodiments, a uniform encoding/decoding scheme may be used for global metadata values, whereas variable encoding/decoding schemes may be used for other metadata values. For instance, a global metadata value associated with an address in an application memory region may be resolved by prepending 16 zeros, regardless of the application memory region. In this manner, metadata labels that are associated with addresses in multiple application memory regions may be encoded uniformly across the different regions.

In some embodiments, different reduced sizes for metadata tags may be used, for example, depending on tagging granularity. For instance, 8-bit metadata values may be used for tagging 16-bit halfwords (e.g., 16-bit instructions), whereas 16-bit metadata values may be used for tagging 32-bit words (e.g., 32-bit instructions), but both types of metadata values may be converted into metadata values of an unreduced size (e.g., 32 bits) for use in evaluating policies (e.g., by a policy processor or a rule cache). In this manner, an appropriate tag size (e.g., a minimum tag size) may be chosen based on metadata complexity associated with a certain tagging granularity.

Figure 3:
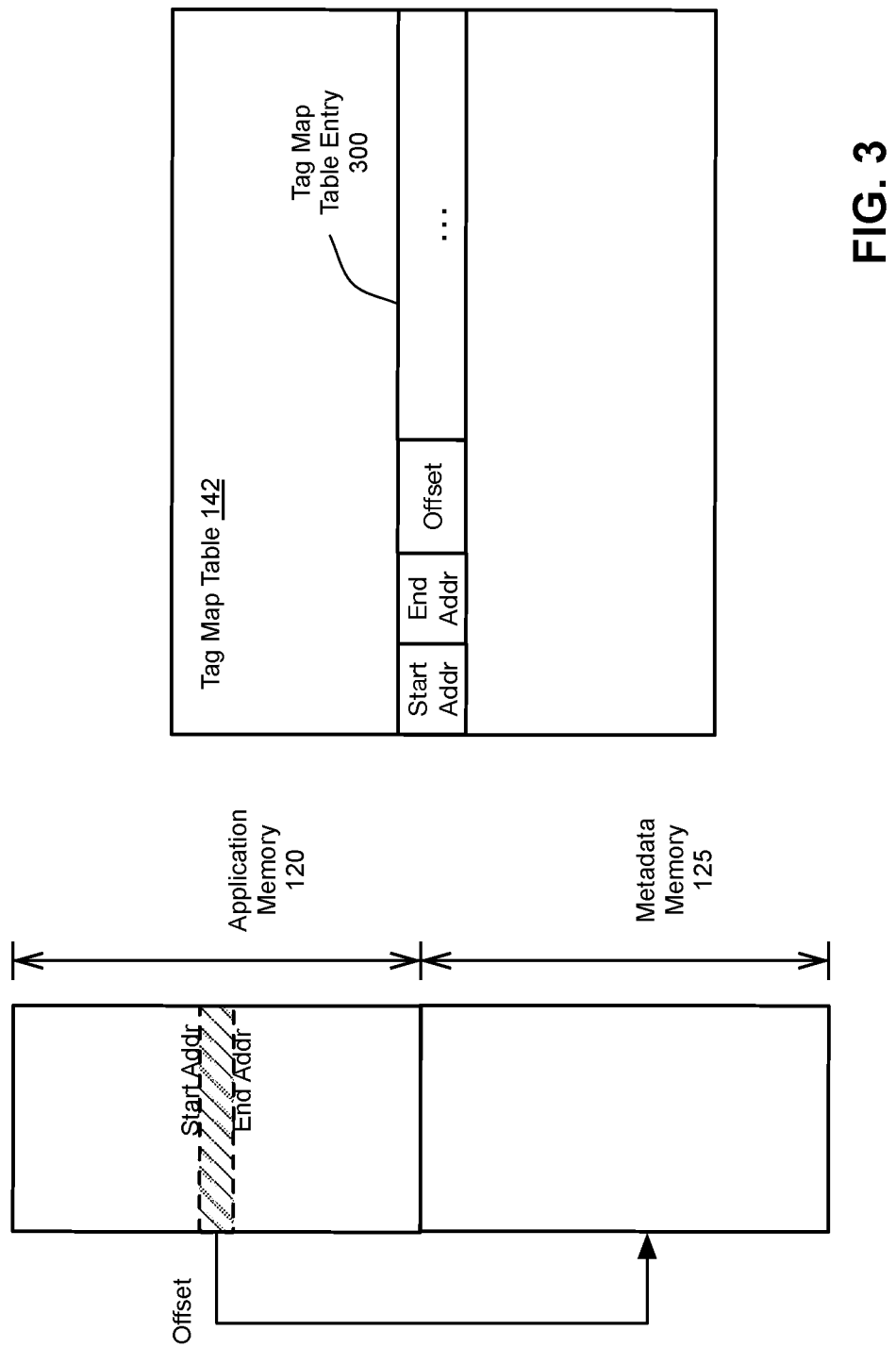
FIG. 3 shows an illustrative tag map table entry 300, in accordance with some embodiments.

In some embodiments, information for mapping application memory addresses to metadata memory addresses may be stored in a tag map table. FIG. 3 shows an illustrative tag map table entry 300, in accordance with some embodiments.

For instance, the entry 300 may be an entry in the illustrative tag map table 142 shown in FIG. 1.

In some embodiments, the tag map table 142 may be implemented as a fully associative array, although that is not required. Additionally, or alternatively, the tag map table 142 may be implemented using a hardware page table walker. For instance, if the tag map table 142 becomes full, one or more overflow entries may be stored in a table in a metadata memory. If an input address does not match any entry in the tag map table 142, the hardware page table walker may be used to walk through the table in the metadata memory to look for an entry that matches the input address.

In the example of FIG. 3, the tag map table entry 300 stores an offset value to be added to an address in an application memory (e.g., the illustrative application memory 120 shown in FIG. 1) to obtain an address in a metadata memory (e.g., the illustrative metadata memory 125 shown in FIG. 1).

Additionally, or alternatively, the tag map table entry 300 may store information that associates the tag map table entry 300 with one or more application memory addresses. For instance, the tag map table entry 300 may store a start address and an end address, which may indicate an address range with which the tag map table entry 300 is associated.

In some embodiments, when a host processor (e.g., the illustrative host processor 110 shown in FIG. 1) attempts to load data from an application memory, a target address of the load instruction may be used by tag processing hardware (e.g., the illustrative tag processing hardware 140 shown in FIG. 1) to determine whether the load instruction should be allowed. The tag processing hardware may match the target address to an entry in a tag map table, such as the tag map table entry 300. For instance, the tag processing hardware may determine that the target address falls within an application memory range indicated by the start address and the end address stored in the tag map table entry 300. The tag processing hardware may then add the offset value stored in the tag map table entry 300 to the target address to obtain a metadata memory address, and may use the metadata memory address to retrieve, from the metadata memory, a metadata tag associated with the target address.

However, it should be appreciated that aspects of the present disclosure are not limited to any particular technique for mapping the target address to a metadata memory address. In some embodiments, a metadata memory address may be obtained by applying a mask to the target address. For instance, the mask may include N zeros, so that a block of $2^N$ addresses may be mapped to a same metadata memory address. A result of masking the N least significant bits to zero may be compared to a first value. If the result matches the first value, the target address may be combined with a second value (e.g., using an OR operation) to obtain the metadata memory address. In some embodiments, the first value may be indicative of an address block of size $2^N$ in the application memory, and the second value may be indicative of an offset with N trailing zeros. The first and second values may not share any power of 2, so that combing the target address with the second value using an OR operation may result in a sum of the target address and the offset. This may provide savings in terms of area on a chip, because an OR operations may be simpler to implement than an addition operation.

In the example shown in FIG. 3, the application memory and the metadata memory are portions of a same physical memory. A memory management component may be used that implements an appropriate protection scheme to prevent instructions executing on the host processor from modifying metadata stored in the metadata memory. However, it should be appreciated that aspects of the present disclosure are not so limited. In some embodiments, the application memory and the metadata memory may be implemented on physically separate memories, and an appropriate mapping scheme may be used to map application memory addresses to metadata memory addresses.

In some embodiments, information for decoding metadata values may be stored in a tag map table, in addition to, or instead of, information for mapping application memory addresses to metadata memory addresses. FIG. 4 shows another illustrative tag map table entry 400, in accordance with some embodiments. In this example, the tag map table entry 400 includes a field denoted "UTag" (for "upper tag"), which may store a value for use in resolving an encoded metadata value retrieved from a metadata memory (e.g., the illustrative metadata memory 125 shown in FIG. 1) into a decoded metadata value to be provided to a policy processor (e.g., the illustrative policy processor 150 shown in FIG. 1) or a rule cache (e.g., the illustrative rule cache 144 shown in FIG. 1). For instance, the UTag field may store a 16-bit prefix to be prepended to 16-bit encoded metadata values to obtain 32-bit decoded metadata values.

It should be appreciated that aspects of the present disclosure are not limited to any particular metadata encoding/decoding scheme. For instance, the prefix in the UTag field may have any suitable length (e.g., 1 bit, 2 bits, 3 bits, 4 bits, ..., 8 bits, ..., 16 bits, etc.). Moreover, the tag map table entry 400 may include an "LTag" (for "lower tag") field in addition to, or instead of, the UTag field. The LTag field may store a postfix to be appended to encoded metadata values, and the postfix may have any suitable length (e.g., 1 bit, 2 bits, 3 bits, 4 bits, ..., 8 bits, ..., 16 bits, etc.).

Additionally, or alternatively, the tag map table entry 400 may include an "ATag" (for "additional tag") field and an "Pos" (for "position") field. The Pos field may store a value indicating a bit position dividing an encoded metadata value into upper and lower portions, between which a bit string stored in the ATag field is to be inserted. In some instances, the Pos field may indicate that the lower portion is empty, so that the bit string stored in the ATag field is to be appended, like a postfix stored in an LTag field. In some instances, the Pos field may indicate that the upper portion is empty, so that the bit string stored in the ATag field is to be prepended, like a prefix stored in a UTag field.

In some embodiments, another suitable transformation may be used in addition to, or instead of, inserting values by prepending, appending, or inserting at an internal bit position. Such a transformation may result in a decoded metadata value of any suitable length, which may be larger or small than, or equal to, a length of a corresponding encoded metadata value.

In some embodiments, the prefix in the UTag field may correspond to an address range indicated by a start address and an end address stored in the tag map table entry 400. Thus, by storing different prefixes in different tag map table entries, different encodings may be provided for different address ranges, respectively. However, it should be appreciated that aspects of the present disclosure are not limited to storing a different prefix in each tag map table entry. For instance, in some embodiments, an application memory (e.g., the illustrative application memory 120 shown in FIG. 1) may include a plurality of regions, such as regions AMR1, AMR2, and AMR3 in the example of FIG. 4. Metadata associated with addresses in the regions AMR1, AMR2, and AMR3 may be stored in metadata memory regions MMR1, MMR2, and MMR3, respectively. For address ranges within a same application memory region, a same metadata prefix may be used, whereas different metadata prefixes may be used for address ranges in different application memory regions, respectively.

In some embodiments, the tag map table entry 400 may include a field denoted "No. of Bits," in addition to, or instead of, the UTag field. The No. of Bits field may store a value indicating a length of an encoded metadata value to be retrieved from the metadata memory. For instance, the No. of Bits field may store a value indicating that the encoded metadata value may have a length of zero bits, one bit, two bits, three bits, four bits, five bits, ..., 8 bits (or one byte), ..., 16 bits (or two bytes), etc. However, it should be appreciated that aspects of the present disclosure are not limited to indicating encoded metadata length in terms of bits. In some embodiments, a "No. of Bytes" field may be provided.

The inventors have recognized and appreciated that the No. of Bits field and the UTag field may be used in combination to provide flexible encoding/decoding schemes. For instance, the UTag field may store a 32-bit value. Depending on an encoded metadata length indicated in the No. of Bits field, more or fewer bits from the UTag field may be used for decoding. As an example, the No. of Bits field may indicate an encoded metadata length of 0 bits, and the 32-bit value in the UTag field may be used as a 32-bit decoded metadata value. No metadata value may be retrieved from the metadata memory. As another example, the No. of Bits field may indicate an encoded metadata length of 8 bits (or one byte), and the upper 24 bits of the 32-bit value in the UTag field may be prepended to an 8-bit encoded metadata value retrieved from the metadata memory, resulting in a 32-bit decoded metadata value. As another example, the No. of Bits field may indicate an encoded metadata length of 16 bits (or two bytes), and the upper 16 bits of the 32-bit value in the UTag field may be prepended to a 16-bit encoded metadata value retrieved from the metadata memory, again resulting in a 32-bit decoded metadata value. As another example, the No. of Bits field may indicate an encoded metadata length of 24 bits (or three bytes), and the upper 8 bits of the 32-bit value in the UTag field may be prepended to a 24-bit encoded metadata value retrieved from the metadata memory, again resulting in a 32-bit decoded metadata value.

Any suitable combination of one or more bits from the metadata memory and/or one or more bits from the UTag field may be used, as aspects of the present disclosure are not so limited. Also, aspects of the present disclosure are not limited to decoded metadata values of any particular length. For instance, in some embodiments, 64-bit decoded metadata values may be used, in addition to, or instead of, 32-bit decoded metadata values.

It should be appreciated that aspects of the present disclosure are not limited to having a UTag field or a No. of Bits field. In some embodiments, a tag map table entry may include an "LOffset" field (for "lower offset") and an "UOffset" field (for "upper offset") in addition to, or instead of, the illustrative No. of Bits and UTag fields shown in FIG. 4. The "LOffset" field may be similar to the "Offset" field in the illustrative tag map entry 300 shown in FIG. 3. For instance, an offset value in the "LOffset" field may be added to an input application memory address to obtain a first metadata memory address, from which one or more first bits may be retrieved. A different offset value may be stored in the "UOffset" field, and may be added to the input application memory address to obtain a second metadata memory address, from which one or more second bits may be retrieved. The one or more second bits may be prepended to the one or more first bits to provide a decoded metadata value.

In some embodiments, an input application memory address may be shifted to the right by M bit positions before adding an offset value from the "LOffset" field. In this manner, a block of $2^M$ application memory addresses may be associated with a same lower tag portion. Additionally, or alternatively, an input application memory address may be shifted to the right by N bit positions before adding an offset value from the "UOffset" field. In this manner, a block of $2^N$ application memory addresses may be associated with a same upper tag portion. N may, although need not, be equal to M. For instance, M may be zero (thus no right shifting), whereas N may be non-zero.

In some embodiments, a tag map table entry may include a field that stores information about a compression mechanism, in addition to, or instead of, the illustrative UTag field shown in FIG. 4. For instance, metadata values associated with addresses in an application memory region may be known (e.g., at compile time), so that an appropriate lossless compression mechanism may be chosen for that memory region. As an example, a run-length encoding may be used for a page of metadata values in a metadata memory. Information regarding the encoding may be stored in a tag map table entry, and may be used for decoding. For instance, in some embodiments, a metadata cache may be used, and the information regarding the encoding may be sent to a caching block that inflates/deflates cache lines as part of its operation. Additionally, or alternatively, static analysis may be performed on metadata values associated with addresses in an application memory region (e.g., a region for storing code, as opposed to data), and an appropriate compression mechanism may be selected based on entropy of the metadata values.

In some embodiments, a tag map table entry may include a field that stores information about an encryption mechanism, in addition to, or instead of, information about a compression mechanism. For instance, metadata values associated with addresses in an application memory region may be stored in an external memory, which may be less secure than an on-chip memory. Therefore, the metadata values may be stored in an encrypted form, and a tag map table entry corresponding to the application memory region may store a key for encrypting and/or decrypting the metadata values.

It should be appreciated that encryption may be applied before or after compression, or without compression. Likewise, compression may be applied without encryption. Neither is required.

The inventors have recognized and appreciated that it may sometimes be desirable to use encoded metadata values having a length that is not a power of 2. However, if a length of a metadata value is not a power of 2 (e.g., 24 bits), a ratio between a tagging granularity (e.g., 32 bits) and the length of the metadata value may not be a power of 2 (e.g., 4/3). Therefore, one or more multipliers may be used to generate a metadata memory address from an input application memory address. For instance, the input application memory address may be divided by 4, by right shifting the input address by two bit positions, and then multiplied by 3. The inventors have recognized and appreciated that such multipliers may be costly (e.g., in terms of time, area, and/or power). Accordingly, techniques are provided for handling encoded metadata values having a length that is not a power of 2, without using a multiplier to generate metadata addresses.

In some embodiments, a tag map table entry may store multiple offsets for use in handling encoded metadata values having a length that is not a power of 2. For instance, there may an "Offset1" field and an "Offset0" field, in addition to, or instead of, the No. of Bits field. An offset value in the "Offset1" field may be added to an input application memory address to obtain a first metadata memory address, from which $2^M$ first bits may be retrieved. An offset value in the "Offset0" field may be added to the input application memory address to obtain a second metadata memory address, from which $2^N$ second bits may be retrieved. The $2^N$ second bits may be prepended to the $2^M$ first bits, resulting in an encoded metadata value having a length of $2^M+2^N$. In this manner, encoded metadata values may be handled that have a length of 3 bits ($2^1+2^0$), 5 bits ($2^2+2^0$), 6 bits ($2^2+2^1$), 9 bits ($2^3+2^0$), 10 bits ($2^3+2^1$), 12 bits ($2^3+2^2$), 17 bits ($2^4+2^0$), 18 bits ($2^4+2^1$), 20 bits ($2^4+2^2$), or 24 bits ($2^4+2^3$).

In some embodiments, a tag map table entry may store more than two offsets. For instance, there may an "Offset2" field, in addition to the "Offset1" field and the "Offset0" field. An offset value in the "Offset2" field may be added to an input application memory address to obtain a third metadata memory address, from which $2^O$ third bits may be retrieved. The $2^O$ third bits, the $2^N$ second bits, and the $2^M$ first bits may be concatenated, resulting in an encoded metadata value having a length of $2^M+2^N+2^O$. In this manner, encoded metadata value may be handled that have a length of 7 bits ($2^2+2^1+2^0$), 11 bits ($2^3+2^1+2^0$), 13 bits ($2^3+2^2+2^0$), 14 bits ($2^3+2^2+2^1$), 19 bits ($2^4+2^1+2^0$), 21 bits ($2^4+2^2+2^0$), 22 bits ($2^4+2^2+2^1$), 25 bits ($2^4+2^3+2^0$), 26 bits ($2^4+2^3+2^1$), or 28 bits ($2^4+2^3+2^2$), It should be appreciated that any suitable number of offsets may be used, such as zero, one, two, three, four, etc. However, the inventors have recognized and appreciated that, with each additional offset, an additional fetch may be performed from a metadata memory or a metadata cache, which may cause a slowdown (e.g., one or more additional clock cycles). Therefore, a suitable number of offsets may be selected to provide a desired level of flexibility with respect to encoded metadata lengths, without significantly impacting performance.

In some embodiments, the tag map table entry 400 may include a field denoted "Global Range," in addition to, or instead of, the No. of Bits and UTag fields. The Global Range field may store a value indicative of a range of metadata values. For instance, the Global Range field may store a value (e.g., 0000 0000 0001 1111) indicating an upper bound of a range starting at zero (e.g., {0000 0000 0000 0000, . . . , 0000 0000 0001 1111}). In some embodiments, if an encoded metadata value retrieved from the metadata memory falls within the range indicated in the Global Range field, the encoded metadata value may be resolved by prepending a suitable number of zeros, without using any prefix from the UTag field. In this manner, a uniform encoding/decoding scheme may be used for encoded metadata values within the range indicated in the Global Range field, whereas variable encoding/decoding schemes may be used for other encoded metadata values.

In some embodiments, the tag map table entry 400 may include a field denoted "Size," in addition to, or instead of, the No. of Bits, UTag, and Global Range fields. The Size field may store a value indicative of a granularity of tagging. As an example, the Size field may store a value indicating that, for the address range indicated by the start address and the end address stored in the tag map table entry 400, tagging is done on a block-by-block basis. For instance, each block may include $2^N$ words, where N is the value stored in the Size field. In this manner, only one metadata value may be stored for an entire block of application memory addresses, which may reduce an amount of memory used to store metadata values. For example, a host processor may attempt to co-locate buffers that are homogeneously tagged (same metadata value for entire buffer) and are larger than a selected threshold size (e.g., $2^{10}$ words, namely, one kilobyte or 1 KB). By storing N=10 in the Size field, only one metadata value may be stored for one kilobyte of application memory, which may represent a 1024 times reduction in metadata memory footprint, compared to word-by-word tagging.

The inventors have recognized and appreciated that one or more of the techniques described herein for encoding metadata for different application memory regions may be used, additionally or alternatively, to encoding metadata for other storage regions. For instance, in some embodiments, a same metadata value may be used to tag all registers in a memory-mapped peripheral device (e.g., a universal asynchronous receiver-transmitter, or UART). This metadata value may be stored directly in a tag map table entry for the peripheral device. However, in some instances, a size of the metadata value may exceed a capacity of the tag map table entry. Accordingly, in some embodiments, a metadata value for a peripheral device may be stored in a metadata memory, and a Size field may be provided in a tag map table entry for the peripheral device. The Size field may store a value selected based on a size of a range of memory addresses associated with the peripheral device (e.g., N=12 for a 4 KB device).

Although the inventors have recognized and appreciated various advantages of applying a lower granularity of tagging (e.g., via the Size field), it should be appreciated that aspects of the present disclosure are not limited to any particular granularity of tagging. In some embodiments, a higher granularity of tagging may be applied, for example, via a mask. In some embodiments, a tag map table entry may include a field that stores a two-bit mask, in addition to, or instead of, the illustrative Size field shown in FIG. 4. As one example, if tagging is to be done on a word-by-word basis (e.g., for 32-bit words) for the address range indicated by the start address and the end address stored in the tag map table entry 400, the two-bit mask may be set to 2'b00. The two-bit mask may be applied to an input application memory address (e.g., 0x123) to obtain a masked application memory address (e.g., 0x120), which may then be mapped to a metadata memory address. In this manner, four different byte-addresses (e.g., 0x120, 0x121, 0x122, and 0x123) may be mapped to a same metadata memory address, thereby effecting word-by-word tagging.

As another example, if tagging is to be done on a halfword-by-halfword basis (e.g., for 16-bit halfwords) for the address range indicated by the start address and the end address stored in the tag map table entry 400, the two-bit mask may be set to 2'b10. The two-bit mask may be applied to an input application memory address (e.g., 0x123) to obtain a masked application memory address (e.g., 0x122), which may then be mapped to a metadata memory address. In this manner, two different byte-addresses (e.g., 0x122 and 0x123) may be mapped to a same metadata memory address, thereby effecting halfword-by-halfword tagging.

Although various metadata encoding techniques are described above in connection with a tag map table entry, it should be appreciated that aspects of the present disclosure are not limited to using a tag map table. In some embodiments, fixed hardware logic and/or a processor programmed by software may be used in addition to, or instead of, a tag map table.

Figure 5A:
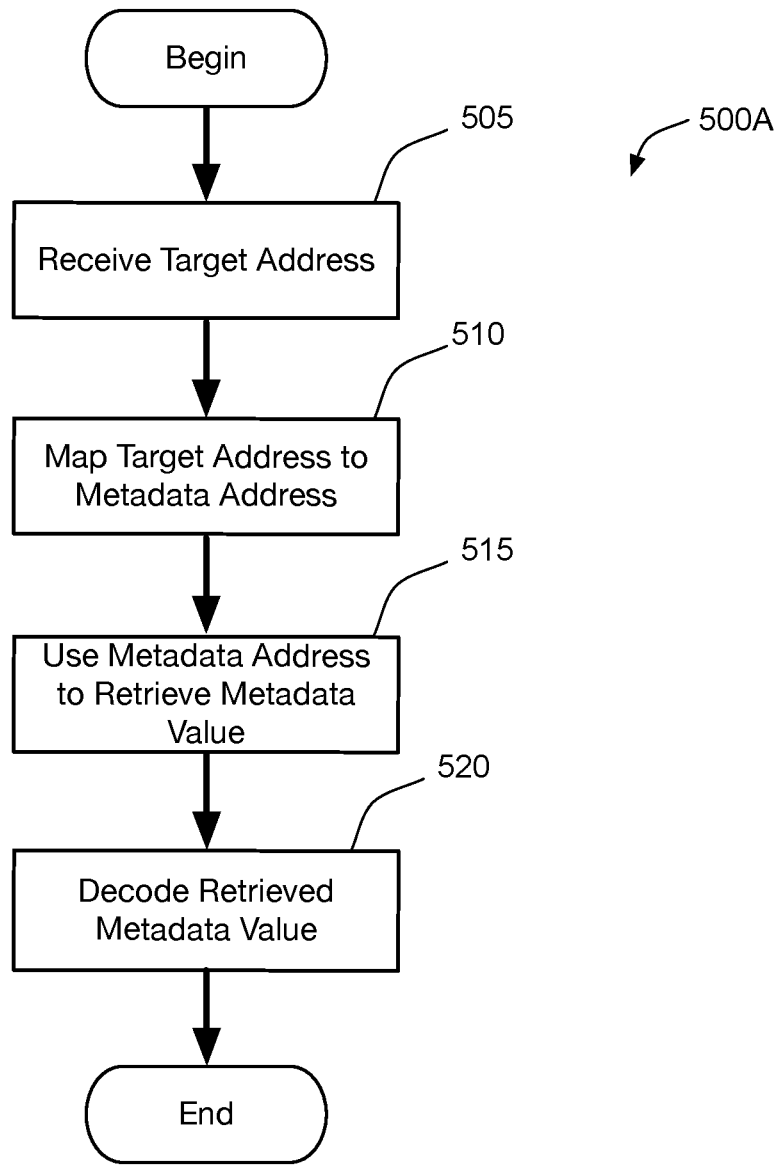
FIG. 5A shows an illustrative process 500A for decoding metadata values, in accordance with some embodiments.

FIG. 5A shows an illustrative process 500A for decoding metadata values, in accordance with some embodiments. For instance, the process 500A may be performed by tag processing hardware (e.g., the illustrative tag processing hardware 140 shown in FIG. 1).

At act 505, the tag processing hardware may receive a target address in an application memory (e.g., the illustrative application memory 120 shown in FIG. 1). For instance, when a host processor (e.g., the illustrative host processor 110 shown in FIG. 1) attempts to load data from, or store data to, the application memory, a target address of the load, or store, instruction may be provided to the tag processing hardware.

At act 510, the tag processing hardware may map the target address to an address in a metadata memory (e.g., the illustrative metadata memory 125 shown in FIG. 1). For instance, the tag processing hardware may match the target address to an entry in a tag map table (e.g., the illustrative tag map table entry 400 shown in FIG. 4). This may be done in any suitable manner. For example, in some embodiments, each entry in the tag map table may store a start address and an end address, thereby indicating a range in the application memory. The target address may be matched to an entry corresponding to an application memory range within which the target address falls.

In some embodiments, an offset value may be stored in the tag map table entry matching the target address (e.g., in the illustrative Offset field shown in FIG. 4). The tag processing hardware may add the offset value to the target address to obtain a metadata memory address. In some embodiments, the target address may be shifted by an appropriate amount prior to adding the offset value. For instance, the tag map table entry matching the target address may store an indication of tagging granularity (e.g., every 32 bits), for example, in the illustrative Size field shown in FIG. 4. Additionally, or alternatively, the tag map table entry matching the target address may store an indication of a length of a metadata value to be retrieved from the metadata memory (e.g., 8 bits), for example, in the illustrative No. of Bits field shown in FIG. 4. The target address may be shifted to the right by an amount determined based on a ratio between the tagging granularity and the metadata length (e.g., shifted by 2 to reflect a ratio of $4=2^2$).

At act 515, the tag processing hardware may use the metadata memory address determined at act 510 to retrieve a metadata value from the metadata memory. In some embodiments, the retrieved metadata value may be of the length indicated in the tag map table entry matching the target address.

At act 520, the tag processing hardware may decode the metadata value retrieved from the metadata memory. For instance, the tag processing hardware may determine a suitable decoding scheme. In some embodiments, the tag map table may store an indication of a selected set of metadata values (e.g., one or more selected ranges of metadata values discussed in connection with the illustrative Global Range field shown in FIG. 4). The tag processing hardware may determine whether the retrieved metadata value belongs to the selected set of metadata values. If the retrieved metadata value belongs to the selected set of metadata values, the tag processing hardware may apply a selected decoding scheme (e.g., prepending a suitable number of zeros to obtain a decoded metadata value of a desired length). If the retrieved metadata value does not belong to the selected set of metadata values, the tag processing hardware may use decoding information stored in the tag map table entry matching the target address to decode the retrieved metadata value. For instance, the tag map table entry matching the target address may store a prefix to be prepended to the retrieved metadata value to obtain a decoded metadata value (e.g., as discussed above in connection with the illustrative UTag field shown in FIG. 4).

Figure 5B:
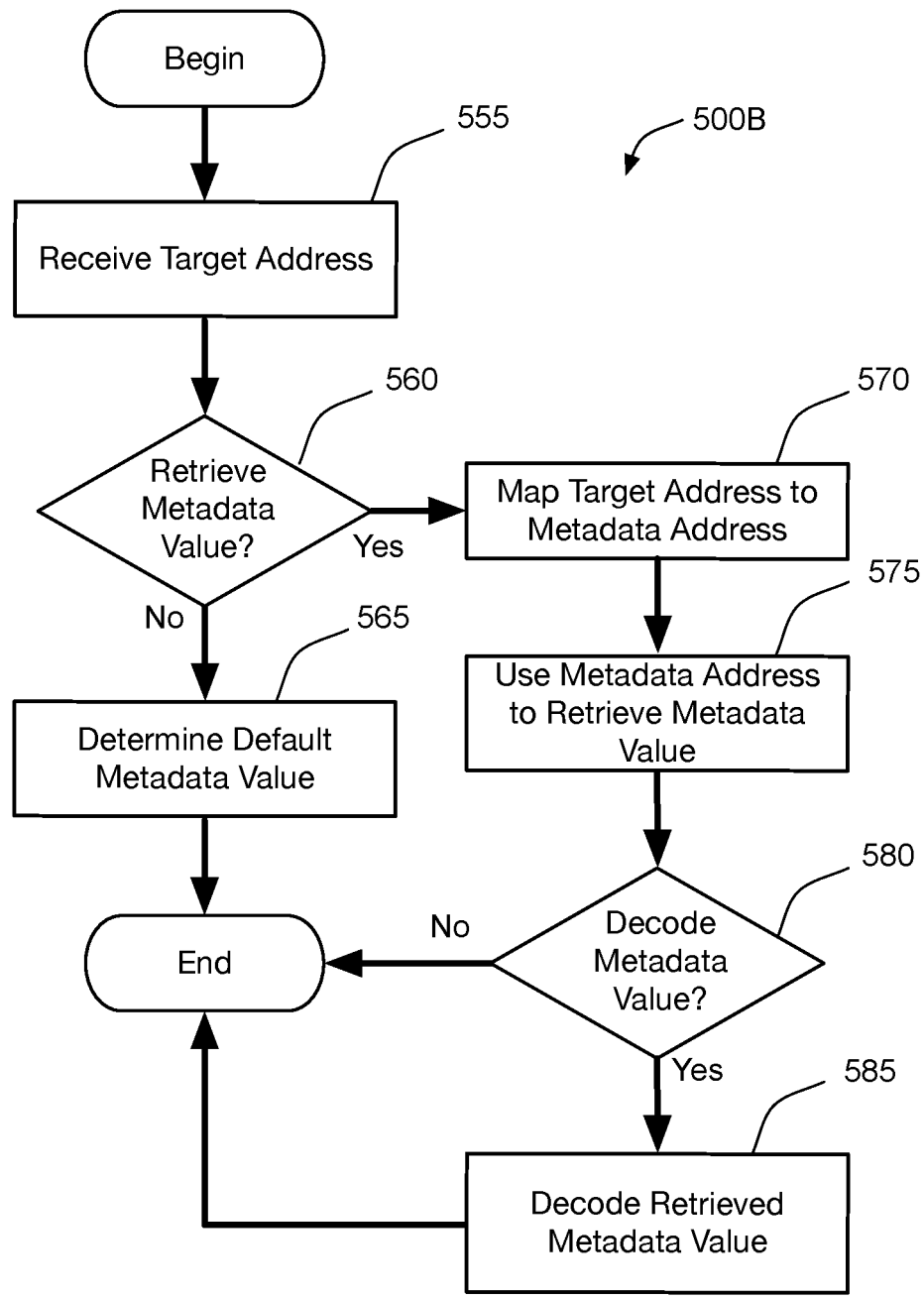
FIG. 5B shows another illustrative process 500B for decoding metadata values, in accordance with some embodiments.

FIG. 5B shows another illustrative process 500B for decoding metadata values, in accordance with some embodiments. For instance, the process 500B may be performed by tag processing hardware (e.g., the illustrative tag processing hardware 140 shown in FIG. 1).

At act 555, the tag processing hardware may receive a target address in an application memory (e.g., the illustrative application memory 120 shown in FIG. 1). For instance, when a host processor (e.g., the illustrative host processor 110 shown in FIG. 1) attempts to load data from, or store data to, the application memory, a target address of the load, or store, instruction may be provided to the tag processing hardware.

At act 560, the tag processing hardware may determine whether to retrieve a metadata value from a metadata memory (e.g., the illustrative metadata memory 125 shown in FIG. 1). For instance, the tag processing hardware may match the target address to an entry in a tag map table (e.g., the illustrative tag map table entry 400 shown in FIG. 4). This may be done in any suitable manner. For example, in some embodiments, each entry in the tag map table may store a start address and an end address, thereby indicating a range in the application memory. The target address may be matched to an entry corresponding to an application memory range within which the target address falls.

In some embodiments, the tag map table entry matching the target address may store an indication of a length of a metadata value to be retrieved from the metadata memory (e.g., in the illustrative No. of Bits field shown in FIG. 4). If the indicated metadata length is zero, the tag processing hardware may determine not to retrieve any value from the metadata memory. The tag processing hardware may, at act 565, determine a default metadata value. For instance, the tag map table entry matching the target address may store a value of an appropriate length (e.g., 32 bits) for use as a default metadata value (e.g., as discussed above in connection with the illustrative UTag field shown in FIG. 4).

In some embodiments, if the indicated metadata length is greater than zero (e.g., 8 bits), the tag processing hardware may, at act 570, map the target address to an address in the metadata memory. In some embodiments, an offset value may be stored in the tag map table entry matching the target address (e.g., in the illustrative Offset field shown in FIG. 4). The tag processing hardware may add the offset value to the target address to obtain a metadata memory address. In some embodiments, the target address may be shifted for an appropriate amount prior to adding the offset value. For instance, the tag map table entry matching the target address may store an indication of tagging granularity (e.g., every 32 bits), for example, in the illustrative Size field shown in FIG. 4. The target address may be shifted to the right by an amount determined based on a ratio between the tagging granularity and the metadata length (e.g., shifted by 2 to reflect a ratio of $4=2^2$).

At act 575, the tag processing hardware may use the metadata memory address determined at act 570 to retrieve a metadata value from the metadata memory. In some embodiments, the retrieved metadata value may be of the length indicated in the tag map table entry matching the target address.

At act 580, the tag processing hardware may determine whether to decode the metadata value retrieved from the metadata memory. For instance, if the length of the retrieved metadata value matches a length expected by a policy processor (e.g., the illustrative policy processor 150 shown in FIG. 1) or a rule cache (e.g., the illustrative rule cache 144 shown in FIG. 1), the tag processing hardware may decide not to decode the retrieved metadata memory. However, that is not required. In some embodiments, the tag processing hardware may use a length-preserving encoding/decoding scheme, and may decode the retrieved metadata value even if the lengths match.

If it is determined that the retrieved metadata value is to be decoded, the tag processing hardware may, at act 585, determine a suitable decoding scheme. For instance, in some embodiments, the tag map table may store an indication of a selected set of metadata values (e.g., one or more selected ranges of metadata values discussed in connection with the illustrative Global Range field shown in FIG. 4). The tag processing hardware may determine whether the retrieved metadata value belongs to the selected set of metadata values. If the retrieved metadata value belongs to the selected set of metadata values, the tag processing hardware may apply a selected decoding scheme (e.g., prepending a suitable number of zeros to obtain a decoded metadata value of a desired length). If the retrieved metadata value does not belong to the selected set of metadata values, the tag processing hardware may use decoding information stored in the tag map table entry matching the target address to decode the retrieved metadata value. For instance, a suitable prefix may be obtained from the default metadata value, and may be prepended to the retrieved metadata value to obtain a decoded metadata value (e.g., as discussed above in connection with the illustrative UTag field shown in FIG. 4).

Although memory accesses are discussed in connection with FIGS. 5A-B, it should be appreciated that the techniques described herein may, additionally or alternatively, be used to encode/decode metadata associated with host processor registers. For instance, a host processor may have a plurality of general-purpose registers and/or configuration registers (e.g., control and/or status registers for RISC-V). In some embodiments, accesses to such registers may be mediated by a tag map table.

Figure 6:
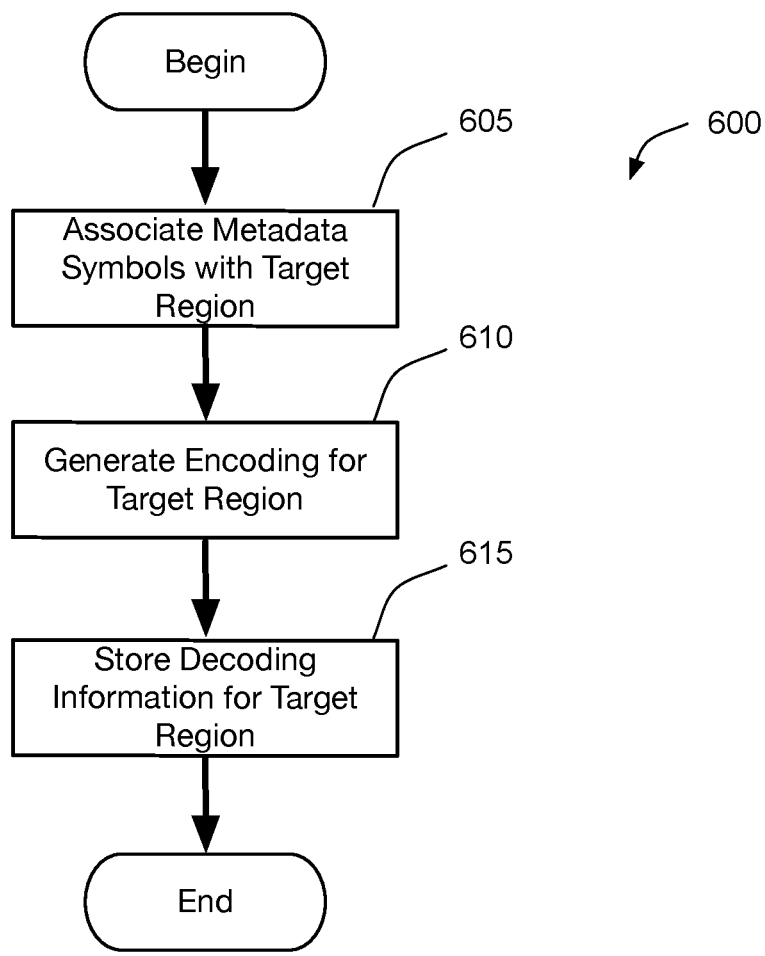
FIG. 6 shows an illustrative process 600 for encoding metadata values, in accordance with some embodiments.

FIG. 6 shows an illustrative process 600 for encoding metadata values, in accordance with some embodiments. For instance, the process 600 may be performed by a policy compiler (e.g., the illustrative policy compiler 220 shown in FIG. 2), a policy linker (e.g., the illustrative policy linker 225 shown in FIG. 2), a policy processor (e.g., the illustrative policy processor 150 shown in FIG. 1) and/or tag processing hardware (e.g., the illustrative tag processing hardware 140 shown in FIG. 1).

At act 605, one or more metadata symbols may be associated with an application memory region. For instance, as discussed above, an "EXECUTE" symbol for an RWX policy may be associated with an application memory region for storing code, a "WRITE" symbol for the RWX policy may be associated with an application memory region for storing data, and/or a "READ" symbol for the RWX policy may be associated with both memory regions. However, it should be appreciated that aspects of the present disclosure are not limited to using any particular policy. In some embodiment, one or more other policies (e.g., a stack policy, a heap policy, etc.) may be used in addition to, or instead of, an RWX policy.

Association between metadata symbols and application memory regions may be performed in any suitable manner. For instance, in some embodiments, the policy compiler and/or the policy linker may obtain information from an ELF file describing code and data layout in an application memory (e.g., the illustrative application memory 120 shown in FIG. 1), and/or flags indicating which memory locations are read only, executable, etc. The policy compiler and/or the policy linker may use such information to associate one or more metadata symbols with an application memory region.

The inventors have recognized and appreciated that direct associations between metadata symbols and application memory regions may be dependent upon memory layout and/or other implementation details of a target system. Thus, an encoding generated based on such associations may not be applicable across different target systems. Accordingly, in some embodiments, associations between metadata symbols and application memory regions may be created indirectly, for example, via domains.

For instance, an application memory may have a region for a program stack, a region for a program heap, and/or a region for one or more ELF data segments. Each of these regions may be associated with a Mem domain, for example, to indicate that the region is in an application memory (e.g., as opposed to a peripheral device). Additionally, or alternatively, these regions may be associated with a Stack domain, a Heap domain, and a Data domain, respectively. Thus, domains may represent virtual regions that may be mapped to physical regions depending on how a target system is implemented.

Additionally, or alternatively, a policy language may be provided that allows metadata symbols to be assigned to one or more domains. For example, the "EXECUTE" symbol may be assigned to a Code domain, the "WRITE" symbol may be assigned to a Data domain, and/or the "READ" symbol may be assigned to both the Code domain and the Data domain.

In some embodiments, the policy compiler and/or the policy linker may be programmed to construct a metadata label based on one or more metadata symbols having one or more associated domains. For instance, a metadata label {EXECUTE, READ} may be constructed by combining metadata labels {EXECUTE} and {READ} (e.g., via a set union). The combined metadata label {EXECUTE, READ} may be associated with an intersection of respective domain sets of the component metadata labels {EXECUTE} and {READ}. For example, the metadata label {EXECUTE} may be associated with {Code}, the metadata label {READ} may be associated with {Code, Data}, and the set intersection may be {Code}.

In some embodiments, the policy compiler and/or the policy linker may be programmed to trigger an error if an attempt is made to combine metadata labels that do not share at least one domain. For instance, if the metadata label {EXECUTE} is associated with {Code}, and the metadata label {WRITE} is associated with {Data}, then an attempt to combine {EXECUTE} with { WRITE} may trigger an error.

In some embodiments, the policy compiler and/or the policy linker may be programmed to associate a set of one or more domains with an application memory region or other storage region. For instance, the policy compiler and/or the policy linker may use information from a target description, which may describe one or more features of an ISA and/or a system-on-chip (SoC) of a given target system, to assign each domain to one or more relevant features in the target description.

As an example, the Data domain may be assigned to an application memory region associated with an ELF file program data section, whereas the Code domain may be assigned to an application memory region associated with an ELF file executable section. As another example, the Mem domain may be assigned to the application memory, whereas a Core domain may be assigned to one or more non-memory aspects of an ISA, such as a register file, one or more control and/or status registers, etc. However, it should be appreciated that aspects of the present disclosure are not limited to using any particular domain, or any domain at all. In some embodiments, one or more domains may be provided based on one or more features of an operating system and/or an application program.

In some embodiments, a metadata label may be associated with an application memory region having at least one domain in common with the metadata label. For instance, the metadata label {EXECUTE, READ}, which may have the domain set {Code}, may be associated with an application memory region having a domain set that also includes Code.

Returning to the example of FIG. 6, an encoding for an application memory region may be generated at act 610, for example, by the policy compiler and/or the policy linker. For instance, metadata labels that are associated, at act 605, with the application memory region may be identified (e.g., metadata labels having at least one domain in common with the application memory region). An encoding may be generated for such metadata labels, for example, by enumerating these metadata labels and using a binary representation of an index of a metadata label in the enumeration as an encoding of the metadata label. Additionally, or alternatively, metadata symbols associated with one or more domains associated with the application memory region may be identified. Each such metadata symbol may be assigned to a respective bit position in a binary representation. A zero or a one in such a bit position may indicate, respective, an absence or presence of the corresponding metadata symbol (or vice versa).

Additionally, or alternatively, a disambiguation value associated with the application memory region may be generated (e.g., to be used as upper, lower, or additional bits, as discussed above in connection with the example of FIG. 4).

In some embodiments, a global encoding may be used for a metadata label associated with multiple application memory regions. For instance, the "READ" symbol for the RWX policy may be associated with both a code memory region and a data memory region. Therefore, the metadata label {READ} may be encoded using the global encoding.

At act 615, decoding information may be stored in association with the application memory region. In some embodiments, a tag map table entry (e.g., the illustrative tag map entry 400 shown in FIG. 4) may be created that corresponds to the application memory region. For instance, the policy compiler and/or the policy linker may use address information from the ELF file and/or one or more linking scripts, the disambiguation value generated at act 610, etc., to initialize the tag map table entry.

Illustrative configurations of various aspects of the present disclosure are provided below.

A1. A method for metadata processing, the method comprising acts of: receiving, from a host processor, a target address; using the target address to access mapping information and decoding information, the mapping information and the decoding information being associated with the target address; using the mapping information to map the target address to a metadata address; using the metadata address to retrieve metadata; and using the decoding information to decode the retrieved metadata.

A2. The method of configuration A1, wherein: the decoding information comprises a value corresponding to an application memory region to which the target address belongs; and using the decoding information to decode the retrieved metadata comprises using the value corresponding to the application memory region to decode the retrieved metadata.

A3. The method of configuration A2, wherein: using the value corresponding to the application memory region to decode the retrieved metadata comprises combining the value corresponding to the application memory region with the retrieved metadata.

A4. The method of configuration A3, wherein: combining the value corresponding to the application memory region with the retrieved metadata comprises prepending the value corresponding to the application memory region to the retrieved metadata.

A5. The method of configuration A1, wherein the act of using the target address to access mapping information and decoding information comprises: matching the target address to an entry in a tag map table, the tag map table entry storing the mapping information and the decoding information.

A6. The method of configuration A5, wherein: the tag map table entry corresponds to an application memory region; and matching the target address to the tag map table entry comprises determining that the target address falls within the application memory region.

A7. The method of configuration A6, wherein: the application memory region comprises an application memory address range; and the tag map table entry stores a start address and an end address of the application memory address range.

A8. The method of configuration A5, wherein: the tag map table entry stores a value indicative of an amount of metadata to be retrieved; and using the metadata address to retrieve metadata comprises retrieving the indicated amount of metadata starting from the metadata address.

A9. The method of configuration A5, wherein: matching the target address to an entry in the tag map table comprises: determining whether the target address matches an entry in the tag map table; and in response to determining that the target address does not match an entry in the tag map table, using a page table walker to determine if the target address matches an overflow entry that is separately stored.

A10. The method of configuration A1, wherein: the mapping information comprises an offset; and using the mapping information to map the target address to a metadata memory address comprises adding the offset.

A11. The method of configuration A1, further comprising an act of: determining whether the retrieved metadata belongs to a selected set of metadata values, wherein the act of using the decoding information to decode the retrieved metadata is performed in response to determining that the retrieved metadata does not belong to the selected set of metadata values.

A12. The method of configuration A11, wherein: the selected set of metadata values comprises a selected range of metadata values.

A13. The method of configuration A1, wherein: the target address comprises an application memory address; and the metadata address comprises a metadata memory address.

A14. The method of configuration A1, wherein: the target address comprises an application register address; and the metadata address comprises a metadata register address.

A15. The method of configuration A1, wherein: the target address comprises an application register address; and the metadata address comprises a metadata memory address.

A16. The method of configuration A1, wherein: the target address comprises an application memory address; and the metadata address comprises a metadata register address.

A17. The method of configuration A1, wherein: the decoding information comprises a cryptographic key; and using the decoding information to decode the retrieved metadata comprises using the cryptographic key to decrypt the retrieved metadata.

B1. A method for metadata processing, the method comprising acts of: receiving, from a host processor, a target address; determining whether to retrieve, from a metadata memory, a metadata value associated with the target address; in response to determining to retrieve a metadata value from the metadata memory: mapping the target address to a metadata address; and using the metadata address to retrieve a metadata value from the metadata memory; and in response to determining not to retrieve a metadata value from the metadata memory, determining a default metadata value.

B2. The method of configuration B1, wherein: determining whether to retrieve a metadata value associated with the target address comprises: matching the target address to an entry in a tag map table, the tag map table entry storing information indicative of a number of bits to be retrieved from the metadata memory; and determining whether the number of bits to be retrieved from the metadata memory is zero.

B3. The method of configuration B2, wherein: the default metadata value is obtained from the tag map table entry.

C1. A method for metadata processing, the method comprising acts of: associating one or more metadata labels with an application memory region; generating an encoding for the one or more metadata labels associated with the application memory region; and generating decoding information corresponding to the encoding for the one or more metadata labels associated with the application memory region.

C2. The method of configuration C1, wherein: the acts of associating one or more metadata labels and generating an encoding for the application memory region are performed at compile time and/or link time.

C3. The method of configuration C2, wherein: the act of generating decoding information is performed at compile time and/or link time.

C4. The method of configuration C1, wherein: the acts of associating one or more metadata labels, generating an encoding for the application memory region, and generating decoding information are performed at run time.

C5. The method of configuration C1, further comprising an act of: storing, at load time, the decoding information in association with the application memory region.

C6. The method of configuration C1, wherein: the act of generating an encoding for the one or more metadata labels associated with the application memory region comprises generating a disambiguation value for the application memory region; and the decoding information comprises the disambiguation value.

C7. The method of configuration C1, wherein: the act of generating an encoding for the one or more metadata labels comprises enumerating the one or more metadata labels.

C8. The method of configuration C1, wherein: the one or more metadata labels comprise one or more first metadata labels; the encoding comprises a first encoding; and the method further comprises an act of: generating a second encoding for one or more second metadata labels, wherein each of the one or more second metadata labels is associated with a plurality of application memory regions.

D1. A method for metadata processing, the method comprising acts of: receiving, from a host processor, a target address; using the target address to access mapping information associated with the target address, wherein: the mapping information is associated with an application memory address range; the target address belongs to the application memory address range; and the mapping information comprises information indicative of a tagging granularity for the application memory address range; using the mapping information to map the target address to a metadata address; and using the metadata address to retrieve metadata.

D2. The method of configuration D1, wherein: the information indicative of a tagging granularity for the application memory address range comprises information indicative of a block of memory addresses with which the retrieved metadata is associated.

D3. The method of configuration D1, wherein: the information indicative of a tagging granularity for the application memory address range comprises information indicative of a number of contiguous words with which the retrieved metadata is associated.

E1. A method for metadata processing, the method comprising acts of: receiving, from a host processor, a target address; using the target address to access mapping information associated with the target address; using the mapping information to map the target address to at least first metadata address and second metadata address; using the first and second metadata addresses to retrieve, respectively, first and second metadata; and combining the first and second metadata.

E2. The method of configuration E1, wherein: the first metadata comprises 2M bits of metadata; the second metadata comprises 2N bits of metadata, where N is different from M; and combining the first and second metadata comprises concatenating the first and second metadata.

F1. A system comprising circuitry and/or one or more processors programmed by executable instructions, wherein the circuitry and/or the one or more programmed processors are configured to perform the method of any of configurations A1-A17, B1-B3, C1-C8, D1-D3, and E1-E2.

F2. At least one computer-readable medium having stored thereon at least one netlist for the circuitry of configuration F1.

F3. At least one computer-readable medium having stored thereon at least one hardware description that, when synthesized, produces the at least one netlist of configuration F2.

F4. The at least one computer-readable medium of configuration F3, wherein the at least one hardware description is in an encrypted form.

F5. At least one computer-readable medium having stored thereon the executable instructions of configuration F1.

Figure 7:
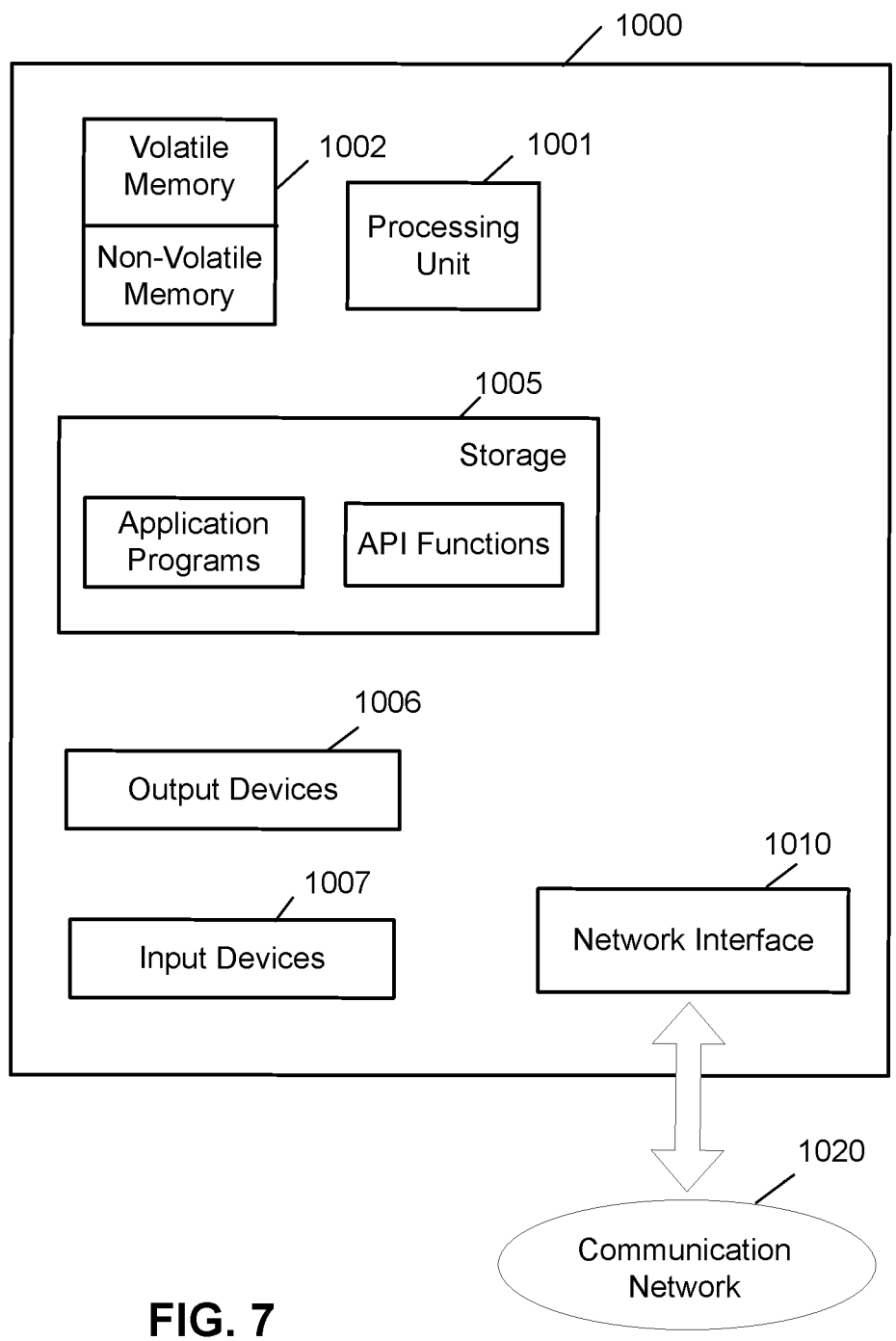
FIG. 7 shows, schematically, an illustrative computer 1000 on which any aspect of the present disclosure may be implemented.

FIG. 7 shows, schematically, an illustrative computer 1000 on which any aspect of the present disclosure may be implemented.

In the example shown in FIG. 7, the computer 1000 includes a processing unit 1001 having one or more processors and a non-transitory computer-readable storage medium 1002 that may include, for example, volatile and/or non-volatile memory. The memory 1002 may store one or more instructions to program the processing unit 1101 to perform any of the functions described herein. The computer 1000 may also include other types of non-transitory computer-readable medium, such as storage 1005 (e.g., one or more disk drives) in addition to the system memory 1002. The storage 1005 may also store one or more application programs and/or resources used by application programs (e.g., software libraries), which may be loaded into the memory 1002.

The computer 1000 may have one or more input devices and/or output devices, such as devices 1006 and 1007 illustrated in FIG. 7. These devices may be used, for instance, to present a user interface. Examples of output devices that may be used to provide a user interface include printers and display screens for visual presentation of output, and speakers and other sound generating devices for audible presentation of output. Examples of input devices that may be used for a user interface include keyboards and pointing devices (e.g., mice, touch pads, and digitizing tablets). As another example, the input devices 1007 may include a microphone for capturing audio signals, and the output devices 1006 may include a display screen for visually rendering, and/or a speaker for audibly rendering, recognized text.

In the example shown in FIG. 7, the computer 1000 also includes one or more network interfaces (e.g., the network interface 1010) to enable communication via various networks (e.g., the network 1020). Examples of networks include a local area network (e.g., an enterprise network) and a wide area network (e.g., the Internet). Such networks may be based on any suitable technology and operate according to any suitable protocol, and may include wireless networks and/or wired networks (e.g., fiber optic networks).

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing descriptions and drawings are by way of example only.

The above-described embodiments of the present disclosure can be implemented in any of numerous ways. For example, the embodiments may be implemented using hardware, software, or a combination thereof. When implemented in software, the software code may be executed on any suitable processor or collection of processors, whether provided in a single computer, or distributed among multiple computers.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure discussed above. The computer-readable medium or media may be transportable, such that the program or programs stored thereon may be loaded onto one or more different computers or other processors to implement various aspects of the present disclosure as discussed above.

The terms "program" or "software" are used herein to refer to any type of computer code or set of computer-executable instructions that may be employed to program one or more processors to implement various aspects of the present disclosure as discussed above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey relationship between the fields. However, any suitable mechanism may be used to establish a relationship between information in fields of a data structure, including through the use of pointers, tags, or other mechanisms that establish relationship between data elements.

Various features and aspects of the present disclosure may be used alone, in any combination of two or more, or in a variety of arrangements not specifically discussed in the embodiments described in the foregoing, and are therefore not limited to the details and arrangement of components set forth in the foregoing description or illustrated in the drawings. For example, aspects described in one embodiment may be combined in any manner with aspects described in other embodiments.

Also, the techniques disclosed herein may be embodied as methods, of which examples have been provided. The acts performed as part of a method may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method for metadata processing, the method comprising acts of:
   receiving, from a host processor, a target address, wherein the target address comprises an application memory address or an application register address;
   using the target address to access mapping information and decoding information, the mapping information and the decoding information being associated with the target address;
   using the mapping information to map the target address to a metadata address, wherein the metadata address comprises a metadata memory address or a metadata register address;
   using the metadata address to retrieve metadata; and
   using the decoding information to decode the retrieved metadata, wherein:
      the metadata address comprises a first metadata address;
      the metadata comprises first metadata, the first metadata comprising $2^M$ bits of metadata;
      the method further comprises acts of:
         using the mapping information to map the target address to a second metadata address;
         using the second metadata address to retrieve second metadata, the second metadata comprising $2^N$ bits of metadata, where N is different from M; and
         combining the first and second metadata, comprising concatenating the first and second metadata.

2. The method of claim 1, wherein:
   the decoding information comprises a value corresponding to an application memory region to which the target address belongs; and
   using the decoding information to decode the retrieved metadata comprises combining the value corresponding to the application memory region with the retrieved metadata.

3. The method of claim 1, wherein the act of using the target address to access mapping information and decoding information comprises:
   matching the target address to an entry in a tag map table, comprising determining that the target address falls within an application memory region corresponding to the tag map table entry; and
   accessing the mapping information and the decoding information from the tag map table entry.

4. The method of claim 3, wherein:
   the tag map table entry stores a value indicative of an amount of metadata to be retrieved; and
   using the metadata address to retrieve metadata comprises retrieving the amount of metadata starting from the metadata address.

5. The method of claim 1, wherein the act of using the target address to access mapping information and decoding information comprises:
   determining whether the target address matches an entry in a tag map table;
   in response to determining that the target address does not match an entry in the tag map table, using a page table walker to determine whether the target address matches an overflow entry that is separately stored; and
   in response to determining the target address matches an overflow entry, accessing the mapping information and the decoding information from the overflow entry.

6. The method of claim 1, wherein:
the mapping information comprises an offset; and
using the mapping information to map the target address to a metadata address comprises adding the offset.

7. The method of claim 1, further comprising an act of:
determining whether the retrieved metadata belongs to a selected set of metadata values, wherein the act of using the decoding information to decode the retrieved metadata is performed in response to determining that the retrieved metadata does not belong to the selected set of metadata values.

8. The method of claim 1, further comprising acts of:
associating one or more metadata labels with an application memory region;
generating an encoding for the one or more metadata labels associated with the application memory region; and
generating the decoding information, wherein the decoding information corresponds to the encoding for the one or more metadata labels associated with the application memory region.

9. The method of claim 8, wherein:
the acts of associating one or more metadata labels, generating an encoding, and/or generating the decoding information are performed at compile time and/or link time; and
the method further comprises an act of storing, at load time, the decoding information in association with the application memory region.

10. The method of claim 8, wherein:
the acts of associating one or more metadata labels, generating an encoding for the application memory region, and generating the decoding information are performed at run time.

11. The method of claim 8, wherein:
the act of generating an encoding for the one or more metadata labels associated with the application memory region comprises generating a disambiguation value for the application memory region; and
the decoding information comprises the disambiguation value.

12. The method of claim 8, wherein:
the one or more metadata labels comprise one or more first metadata labels;
the encoding comprises a first encoding; and
the method further comprises an act of:
generating a second encoding for one or more second metadata labels, wherein each of the one or more second metadata labels is associated with a plurality of application memory regions.

13. The method of claim 1, wherein:
the mapping information is associated with an application memory address range;
the target address belongs to the application memory address range; and
the mapping information comprises information indicative of a tagging granularity for the application memory address range.

14. A system comprising:
hardware circuitry and/or one or more hardware processors programmed by executable instructions, wherein the hardware circuitry and/or the one or more programmed hardware processors are configured to perform a method for metadata processing, the method comprising acts of:
receiving, from a host processor, a target address, wherein the target address comprises an application memory address or an application register address;
using the target address to access mapping information and decoding information, the mapping information and the decoding information being associated with the target address;
using the mapping information to map the target address to a metadata address, wherein the metadata address comprises a metadata memory address or a metadata register address;
using the metadata address to retrieve metadata; and
using the decoding information to decode the retrieved metadata, wherein:
the metadata address comprises a first metadata address;
the metadata comprises first metadata, the first metadata comprising $2^M$ bits of metadata;
the method further comprises acts of:
using the mapping information to map the target address to a second metadata address;
using the second metadata address to retrieve second metadata, the second metadata comprising $2^N$ bits of metadata, where N is different from M; and
combining the first and second metadata, comprising concatenating the first and second metadata.

15. At least one non-transitory computer-readable medium having stored thereon at least one hardware description for circuitry and/or executable instructions for programming one or more processors, wherein the circuitry and/or the one or more programmed processors are configured to perform a method for metadata processing, the method comprising acts of:
receiving, from a host processor, a target address, wherein the target address comprises an application memory address or an application register address;
using the target address to access mapping information and decoding information, the mapping information and the decoding information being associated with the target address;
using the mapping information to map the target address to a metadata address, wherein the metadata address comprises a metadata memory address or a metadata register address;
using the metadata address to retrieve metadata; and
using the decoding information to decode the retrieved metadata, wherein:
the metadata address comprises a first metadata address;
the metadata comprises first metadata, the first metadata comprising $2^M$ bits of metadata;
the method further comprises acts of:
using the mapping information to map the target address to a second metadata address;
using the second metadata address to retrieve second metadata, the second metadata comprising $2^N$ bits of metadata, where N is different from M; and
combining the first and second metadata, comprising concatenating the first and second metadata.

16. The system of claim 14, wherein:
the decoding information comprises a value corresponding to an application memory region to which the target address belongs; and
using the decoding information to decode the retrieved metadata comprises combining the value corresponding to the application memory region with the retrieved metadata.

17. The system of claim 14, wherein the act of using the target address to access mapping information and decoding information comprises:
- matching the target address to an entry in a tag map table, comprising determining that the target address falls within an application memory region corresponding to the tag map table entry; and
- accessing the mapping information and the decoding information from the tag map table entry.

18. The system of claim 17, wherein:
- the tag map table entry stores a value indicative of an amount of metadata to be retrieved; and
- using the metadata address to retrieve metadata comprises retrieving the amount of metadata starting from the metadata address.

19. The system of claim 14, wherein the act of using the target address to access mapping information and decoding information comprises:
- determining whether the target address matches an entry in a tag map table;
- in response to determining that the target address does not match an entry in the tag map table, using a page table walker to determine whether the target address matches an overflow entry that is separately stored; and
- in response to determining the target address matches an overflow entry, accessing the mapping information and the decoding information from the overflow entry.

20. The system of claim 14, wherein:
- the mapping information comprises an offset; and
- using the mapping information to map the target address to a metadata address comprises adding the offset.

21. The system of claim 14, wherein the method further comprises an act of:
- determining whether the retrieved metadata belongs to a selected set of metadata values, wherein the act of using the decoding information to decode the retrieved metadata is performed in response to determining that the retrieved metadata does not belong to the selected set of metadata values.

22. The system of claim 14, wherein the method further comprises acts of:
- associating one or more metadata labels with an application memory region;
- generating an encoding for the one or more metadata labels associated with the application memory region; and
- generating the decoding information, wherein the decoding information corresponds to the encoding for the one or more metadata labels associated with the application memory region.

23. The system of claim 22, wherein:
- the hardware circuitry and/or the one or more programmed hardware processors are configured to perform the acts of associating one or more metadata labels, generating an encoding, and/or generating the decoding information at compile time and/or link time; and
- the method further comprises an act of storing, at load time, the decoding information in association with the application memory region.

24. The system of claim 22, wherein:
- the hardware circuitry and/or the one or more programmed hardware processors are configured to perform the acts of associating one or more metadata labels, generating an encoding for the application memory region, and generating the decoding information at run time.

25. The system of claim 22, wherein:
- the act of generating an encoding for the one or more metadata labels associated with the application memory region comprises generating a disambiguation value for the application memory region; and
- the decoding information comprises the disambiguation value.

26. The system of claim 22, wherein:
- the one or more metadata labels comprise one or more first metadata labels;
- the encoding comprises a first encoding; and
- the method further comprises an act of:
  - generating a second encoding for one or more second metadata labels, wherein each of the one or more second metadata labels is associated with a plurality of application memory regions.

27. The system of claim 14, wherein:
- the mapping information is associated with an application memory address range;
- the target address belongs to the application memory address range; and
- the mapping information comprises information indicative of a tagging granularity for the application memory address range.

* * * * *